(12) United States Patent
Okita

(10) Patent No.: US 10,306,192 B2
(45) Date of Patent: May 28, 2019

(54) IMAGE PROCESSING APPARATUS, IMAGE PROCESSING METHOD AND IMAGE CAPTURE APPARATUS FOR DEMOSAICING

(71) Applicant: CANON KABUSHIKI KAISHA, Tokyo (JP)

(72) Inventor: Masaki Okita, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 86 days.

(21) Appl. No.: 15/384,711

(22) Filed: Dec. 20, 2016

(65) Prior Publication Data

US 2017/0180681 A1 Jun. 22, 2017

(30) Foreign Application Priority Data

Dec. 21, 2015 (JP) ................................. 2015-249036

(51) Int. Cl.
*H04N 9/04* (2006.01)
*H04N 5/232* (2006.01)

(52) U.S. Cl.
CPC ......... *H04N 9/045* (2013.01); *H04N 5/23232* (2013.01); *H04N 2209/046* (2013.01); *H04N 2209/048* (2013.01)

(58) Field of Classification Search
CPC ...... H04N 9/045; H04N 9/09; H04N 5/23232; H04N 5/23229; G06T 5/50
See application file for complete search history.

(56) References Cited

U.S. PATENT DOCUMENTS

| 9,204,030 | B2 | 12/2015 | Okita | |
| 9,571,731 | B2 * | 2/2017 | Shabtay | ............... H04N 5/2258 |
| 9,876,952 | B2 * | 1/2018 | Shabtay | .................. G06T 7/337 |
| 2007/0292048 | A1 * | 12/2007 | Choe | .................. H04N 5/23232 382/286 |

(Continued)

FOREIGN PATENT DOCUMENTS

| CN | 101090457 A | 12/2007 |
| CN | 103329541 A | 9/2013 |

(Continued)

OTHER PUBLICATIONS

Chinese Office Action dated Jul. 3, 2018 and issued in corresponding Chinese Patent Application No. 201611186373.8 with English translation.

*Primary Examiner* — Nicholas G Giles
(74) *Attorney, Agent, or Firm* — Carter, DeLuca & Farrell LLP

(57) ABSTRACT

First image data and second image data are image data in which each pixel value corresponds to one of a plurality of color components that constitute a color filter of an image sensor. Also, the second image data is image data whose field of view overlaps the field of view of the first image data, and whose resolution is higher than that of the first image data. An image processing apparatus performs color interpolation processing on the first image data by referring to, out of the values of the pixels that constitute the second image data, the value of a pixel at a first position corresponding to the position of a pixel to be interpolated in the first image data or a position closest to the first position.

15 Claims, 18 Drawing Sheets

(56) References Cited

U.S. PATENT DOCUMENTS

| | | | | |
|---|---|---|---|---|
| 2008/0024390 A1* | 1/2008 | Baker | ............... | G06T 3/4053 |
| | | | | 345/1.3 |
| 2008/0211968 A1* | 9/2008 | Murakami | ........... | H04N 7/0142 |
| | | | | 348/699 |
| 2010/0201831 A1* | 8/2010 | Weinstein | ............. | H04N 9/045 |
| | | | | 348/221.1 |
| 2010/0277619 A1* | 11/2010 | Scarff | ............... | H04N 5/2258 |
| | | | | 348/240.1 |
| 2013/0335599 A1* | 12/2013 | Zhang | ............... | H04N 13/25 |
| | | | | 348/239 |
| 2015/0085174 A1* | 3/2015 | Shabtay | ............. | H04N 5/23296 |
| | | | | 348/336 |
| 2015/0288950 A1* | 10/2015 | Zhang | ............... | H04N 13/025 |
| | | | | 348/47 |
| 2017/0099435 A1* | 4/2017 | Chen | ............... | H04N 5/23232 |

FOREIGN PATENT DOCUMENTS

| | | |
|---|---|---|
| JP | 2001-169301 A | 6/2001 |
| JP | 2009-105984 A | 5/2009 |

* cited by examiner

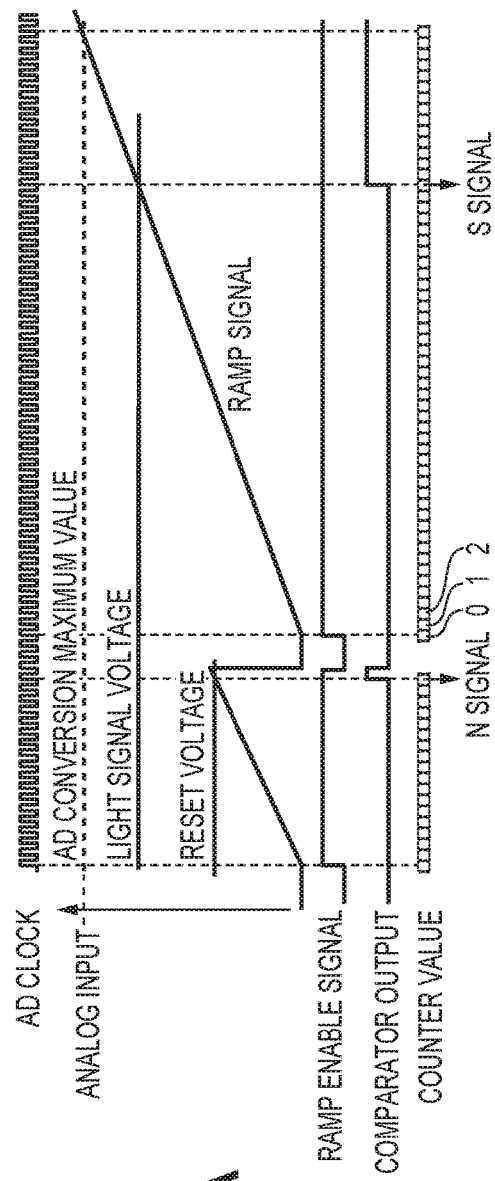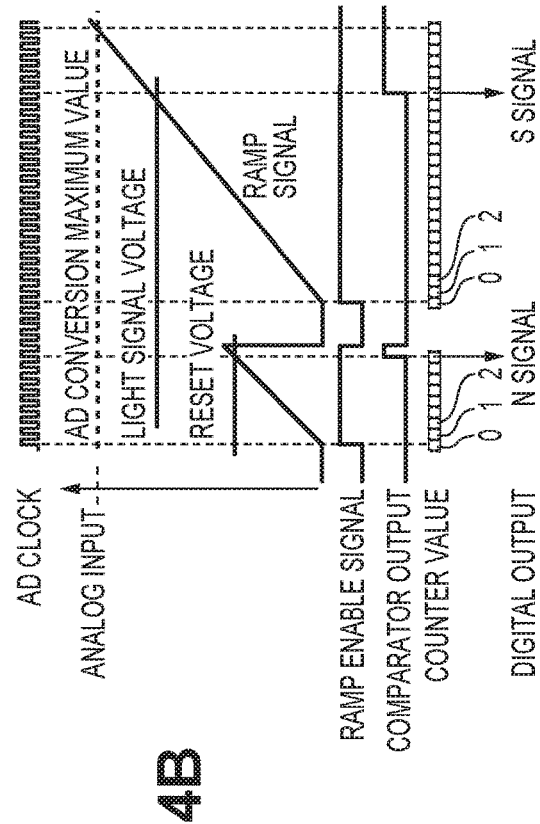
FIG. 4A
FIG. 4B

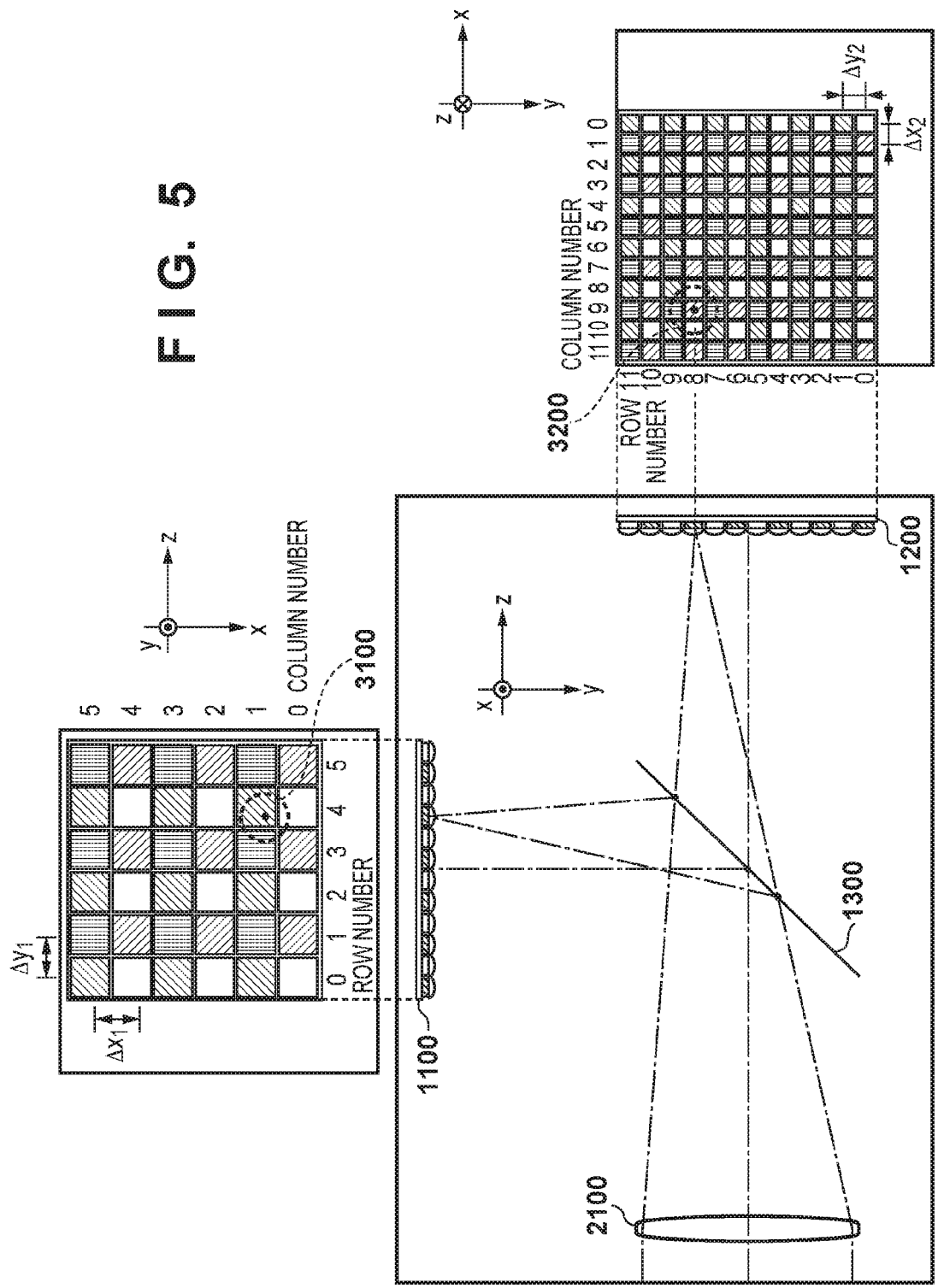

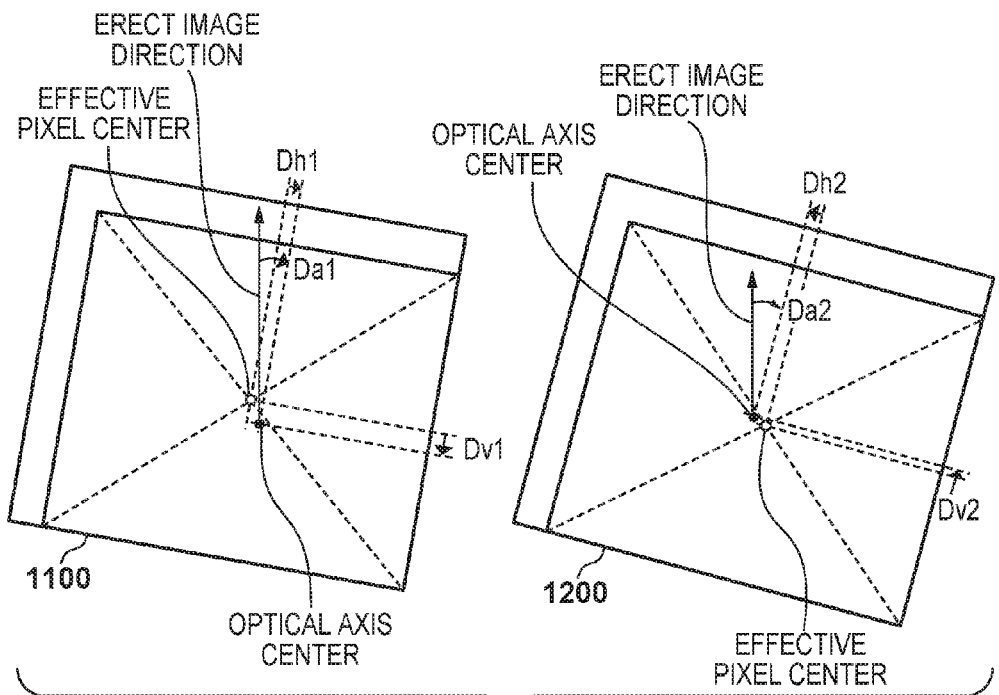
F I G. 6A
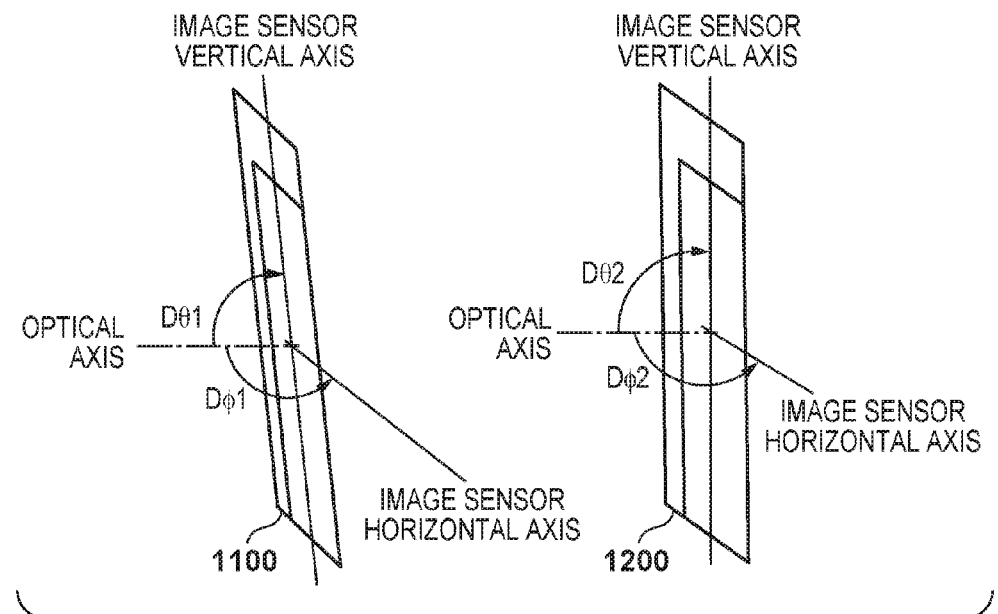
F I G. 6B

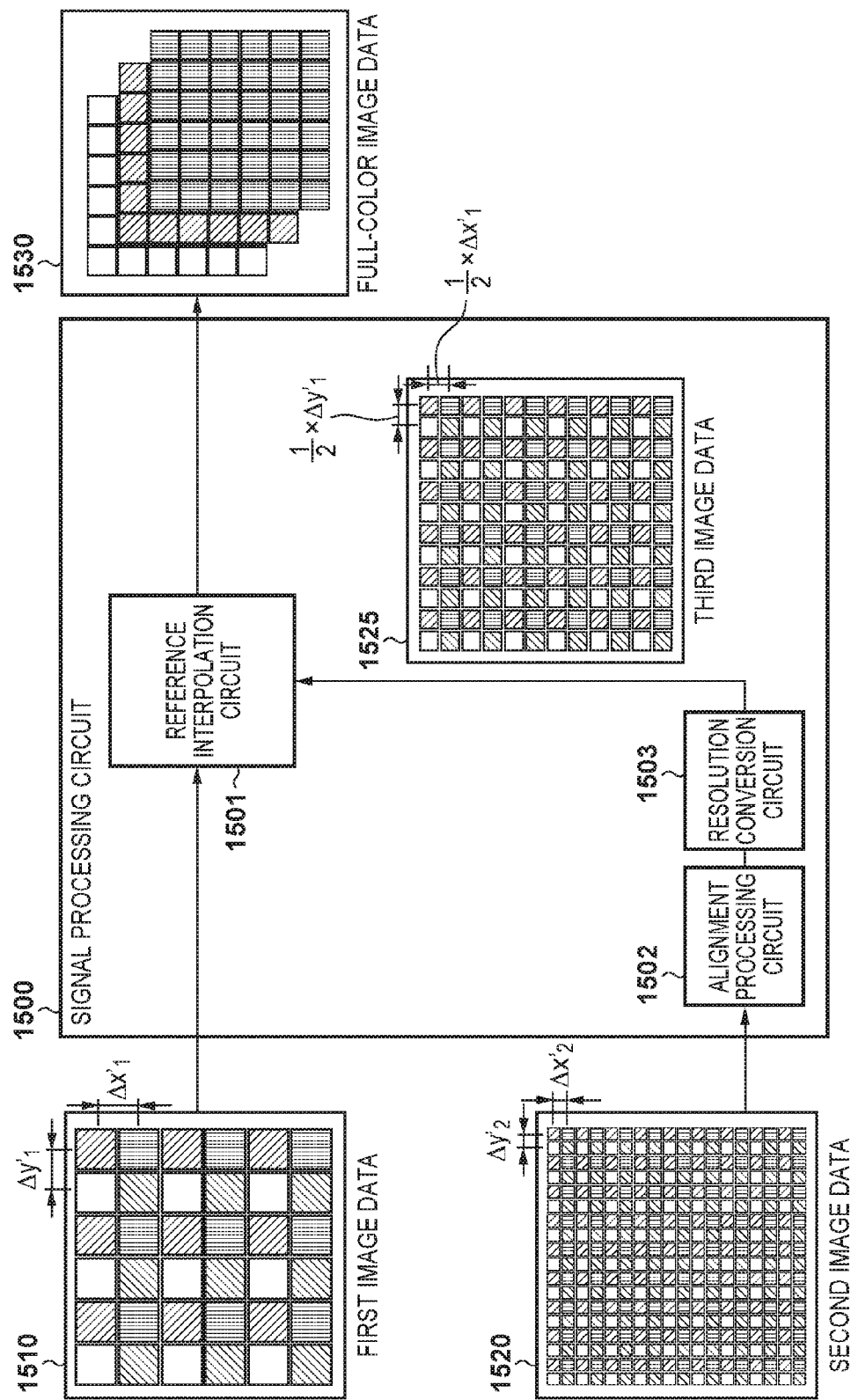

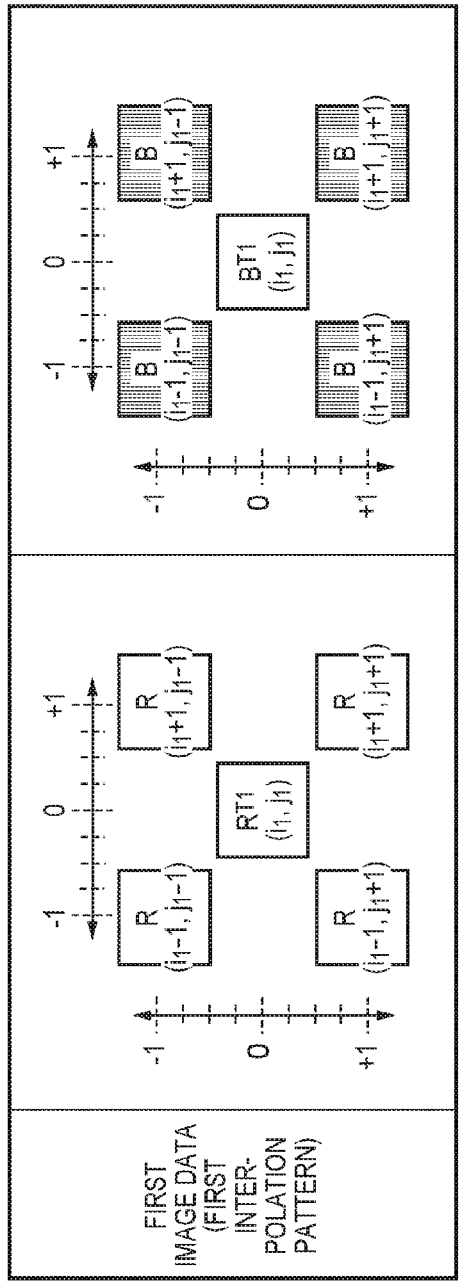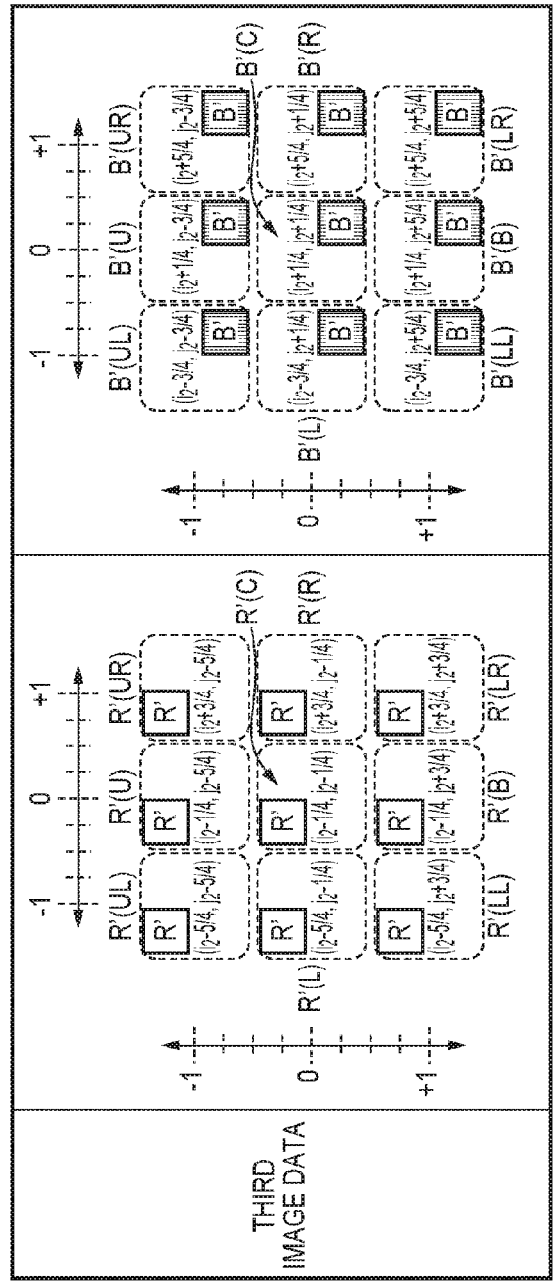
FIG. 9A / FIG. 9B

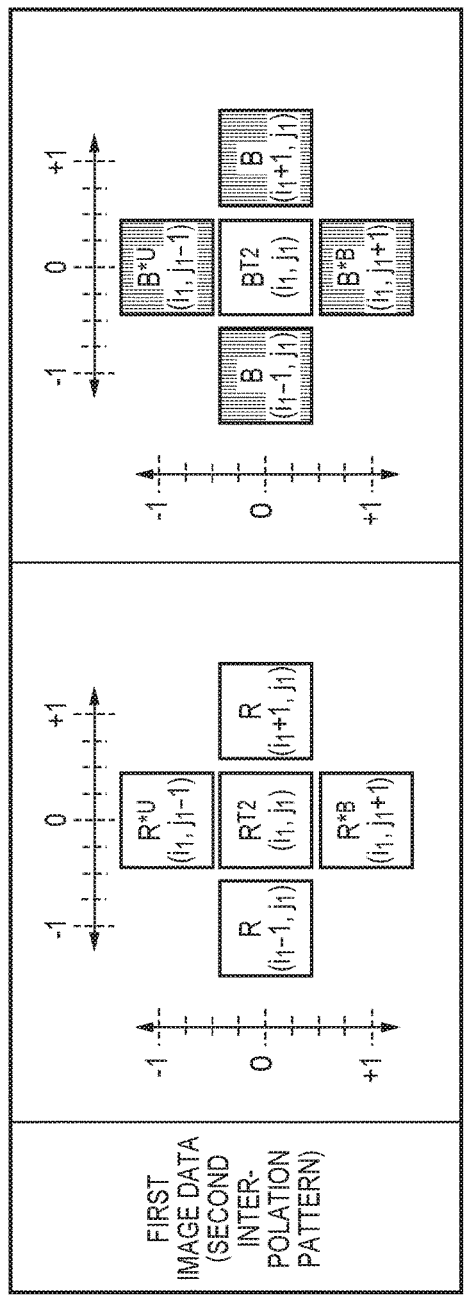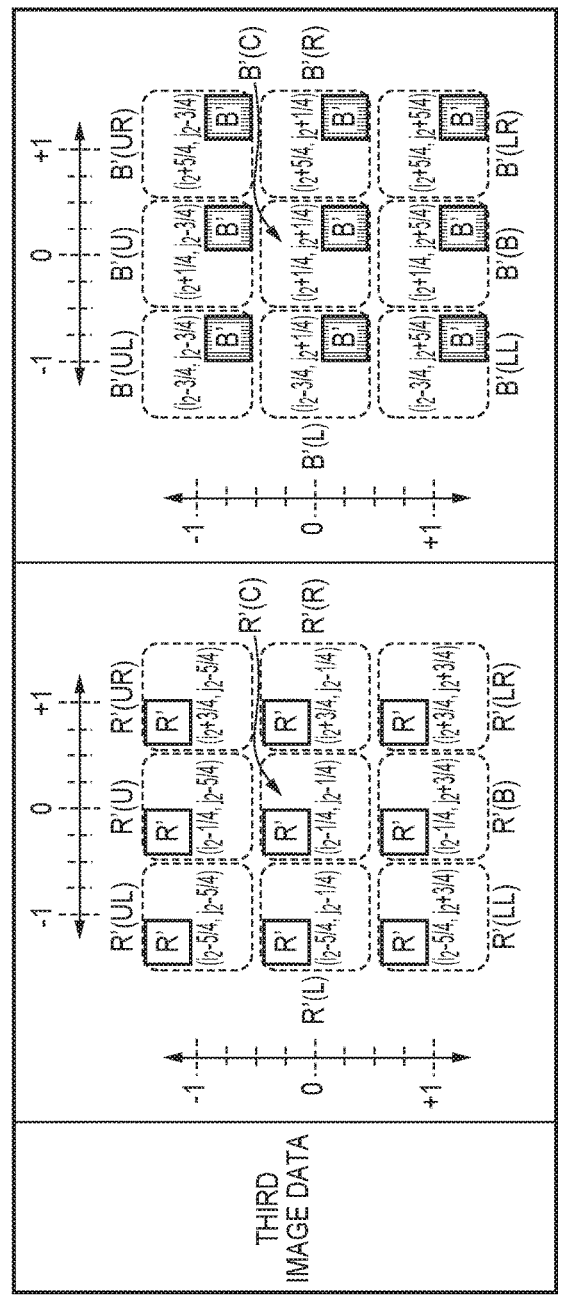
F I G. 10A    F I G. 10B

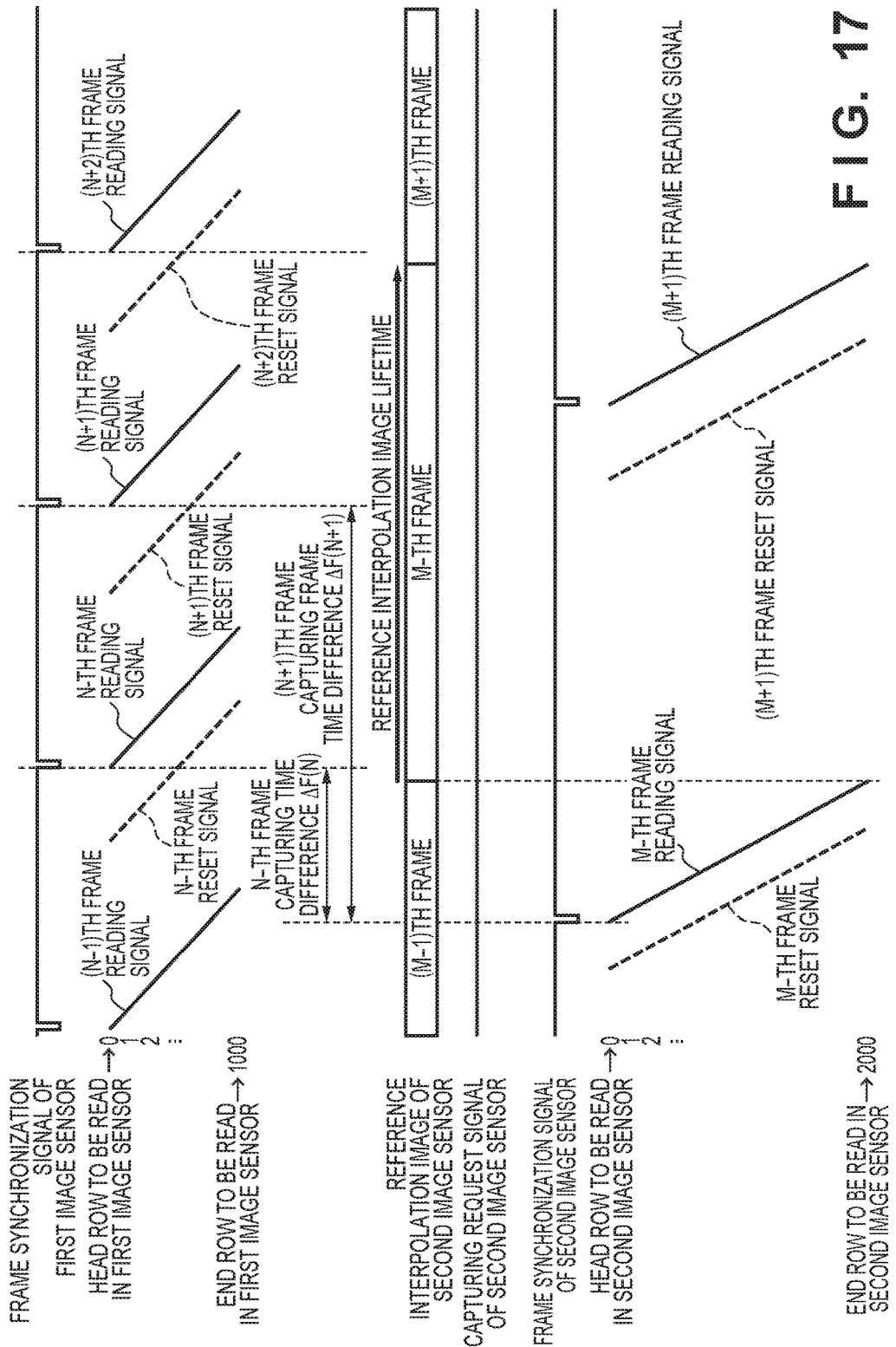
F I G. 17

IMAGE PROCESSING APPARATUS, IMAGE PROCESSING METHOD AND IMAGE CAPTURE APPARATUS FOR DEMOSAICING

BACKGROUND OF THE INVENTION

Field of the Invention

The present invention relates to an image processing apparatus, an image processing method and an image capture apparatus.

Description of the Related Art

Currently, in digital cameras (including digital cameras built in electronic devices such as smartphones and personal computers), a single-plane type color image sensor is generally used. The single-plane type color image sensor is provided with a mosaic color filter (hereinafter, simply referred to as a color filter), and generates a full-color image by a combination of the mosaic color filter and color interpolation processing (demosaicing).

There are many variations in the color components that constitute the color filter and in the arrangement thereof, but color filters with the primary color Bayer array are widely used. The primary color Bayer array is an array in which rows including alternately arranged red and green filters and rows including alternately arranged green and blue filters appear alternately in the column direction. In an image sensor provided with a color filter with the primary color Bayer array (hereinafter, referred to as a Bayer-type image sensor), each of the pixels outputs a signal corresponding to the luminance of red (R), green (G) or blue (B).

A full-color image is an image in which each of the pixels that constitute the image has the value of an RGB component. Therefore, in order to generate a full-color image from signals that can be obtained with a Bayer-type image sensor, it is necessary to generate two color component values for each pixel by demosaicing. Various algorithms have been suggested regarding demosaicing in order to obtain a high quality image, but interpolation is performed based on signals at other positions, and thus there is the possibility that color moiré and a pseudo color will occur.

Meanwhile, a method for obtaining a high-quality full-color image using a plurality of image sensors has been suggested. Japanese Patent Laid-Open No. 2009-105984 discloses a technique for obtaining a moving image that has a high resolution and a high frame rate using two image sensors having the same structure as a color image sensor (640 horizontal RGB pixels) and a monochromatic image sensor (1920 horizontal monochromatic pixels). Specifically, after capturing alternately with the two image sensors, frame interpolation is performed on moving images obtained by the image sensors such that the moving images are converted into moving images having a frame rate twice the frame rate at the time of the capturing. Two frame images corresponding to the same time are combined so as to generate a color moving image having a high luminance resolution and a frame rate twice the frame rate at the time of the capturing.

Moreover, in Japanese Patent Laid-Open No. 2001-169301, two full-color images are generated using first and second Bayer-type image sensors arranged so as to be shifted by ½ pixel from each other, and the pixels are arranged in a checkered pattern, whereby image data having a higher resolution than image data generated by separately using the image sensors is generated.

According to the technique of Japanese Patent Laid-Open No. 2009-105984, luminance information and color information are alternately obtained, and thus timings for obtaining the information are different, thereby causing deterioration in the image quality of composite images especially in moving image capturing.

Moreover, in Japanese Patent Laid-Open No. 2001-169301, the images obtained with the two image sensors are combined after color interpolation processing, and an improvement in the accuracy of color interpolation processing is not taken into consideration.

SUMMARY OF THE INVENTION

The present invention has been made in view of such issues in conventional techniques, and provides an image processing apparatus and an image processing method that improve the accuracy of color interpolation processing using a plurality of images.

According to an aspect of the present invention, there is provided an image processing apparatus comprising: a signal processing circuit that obtains first image data and second image data, and executes color interpolation processing on the first image data by referring to the second image data, wherein a field of view of the second image data overlaps a field of view of the first image data, and resolution of the second image data is higher than that of the first image data, wherein: each pixel value in the first image data corresponds to one color component out of a plurality of color components that constitute a color filter of an image sensor used for obtaining the first image data, each pixel value in the second image data corresponds to one color component out of a plurality of color components that constitute a color filter of an image sensor used for obtaining the second image data, and the signal processing circuit executes color interpolation processing on the pixel to be interpolated by referring to, out of values of pixels that constitute the second image data, a value of a pixel (i) at a first position corresponding to a position of a pixel to be interpolated in the first image data or pixel (ii) at a second position being closest to the first position.

According to another aspect of the present invention, there is provided an image capture apparatus comprising: a first image sensor; a second image sensor; and an image processing apparatus comprising: a signal processing circuit that obtains first image data and second image data, and executes color interpolation processing on the first image data by referring to the second image data, wherein a field of view of the second image data overlaps a field of view of the first image data, and resolution of the second image data is higher than that of the first image data, wherein: each pixel value in the first image data corresponds to one color component out of a plurality of color components that constitute a color filter of an image sensor used for obtaining the first image data, each pixel value in the second image data corresponds to one color component out of a plurality of color components that constitute a color filter of an image sensor used for obtaining the second image data, and the signal processing circuit executes color interpolation processing on the pixel to be interpolated by referring to, out of values of pixels that constitute the second image data, a value of a pixel (i) at a first position corresponding to a position of a pixel to be interpolated in the first image data or pixel (ii) at a second position being closest to the first position, wherein the first image data is obtained using the first image sensor, and the second image data is obtained using the second image sensor.

According to a further aspect of the present invention, there is provided an image processing method executed by an image processing apparatus, the method comprising:

obtaining first image data and second image data, wherein a field of the second image data overlaps a field of view of the first image data, and resolution of the second image data is higher than that of the first image data; and executing color interpolation processing on the first image data by referring to the second image data, wherein each pixel value in the first image data corresponds to one color component out of a plurality of color components that constitute a color filter of an image sensor used for obtaining the first image data, each pixel value in the second image data corresponds to one color component out of a plurality of color components that constitute a color filter of an image sensor used for obtaining the second image data, and in the executing, out of values of pixels that constitute the second image data, a value of a pixel (i) at a first position corresponding to a position of a pixel to be interpolated in the first image data or pixel (ii) at a position closest to the first position is referred to.

According to another aspect of the present invention, there is provided a non-transitory computer-readable storage medium storing a program for causing a computer to function as an image processing apparatus comprising: a signal processing circuit that obtains first image data and second image data, and executes color interpolation processing on the first image data by referring to the second image data, wherein a field of view of the second image data overlaps a field of view of the first image data, and resolution of the second image data is higher than that of the first image data, wherein: each pixel value in the first image data corresponds to one color component out of a plurality of color components that constitute a color filter of an image sensor used for obtaining the first image data, each pixel value in the second image data corresponds to one color component out of a plurality of color components that constitute a color filter of an image sensor used for obtaining the second image data, and the signal processing circuit executes color interpolation processing on the pixel to be interpolated by referring to, out of values of pixels that constitute the second image data, a value of a pixel (i) at a first position corresponding to a position of a pixel to be interpolated in the first image data or pixel (ii) at a second position being closest to the first position.

Further features of the present invention will become apparent from the following description of exemplary embodiments with reference to the attached drawings.

BRIEF DESCRIPTION OF THE DRAWINGS

FIGS. 4A and 4B are diagrams related to operations of an "AD high-resolution" mode and an "AD high-speed" mode of a column AD converter according to the embodiments.

FIG. 5 is a diagram illustrating image projection in the first embodiment.

FIGS. 6A and 6B are diagrams related to misalignment between image forming planes of a first image sensor and a second image sensor.

FIG. 7 is a block diagram showing an example of a functional configuration of a signal processing circuit in the first embodiment.

FIGS. 9A and 9B are diagrams showing the coordinate relation of R pixels and the coordinate relation of B pixels in a first interpolation pattern in the reference interpolation circuit in the embodiments.

FIGS. 10A to 10B are diagrams illustrating the coordinate relation of R pixels and the coordinate relation of B pixels in a second interpolation pattern in the reference interpolation circuit in the embodiments.

FIG. 17 is a diagram illustrating control of image sensor readout in the third embodiment.

DESCRIPTION OF THE EMBODIMENTS

Exemplary embodiments of the present invention will now be described in detail in accordance with the accompanying drawings. Note that examples will be described below in which an image processing apparatus according to the embodiments of the present invention is applied to a digital camera, but in the present invention, functions related to capturing and recording a captured image are not necessary. The present invention can be implemented in any electronic device that can obtain a plurality of images that have been captured concurrently. Examples of such an electronic device include digital still or video cameras, personal computers, gaming devices, mobile phones, mobile information terminals, car navigation systems, drive recorders, robots and the like, but the present invention is not limited thereto. Moreover, color interpolation processing (demosaicing) for moving image frames will be described below, but the present invention can also be applied to still images in a similar manner.

First Embodiment

Figure 1:
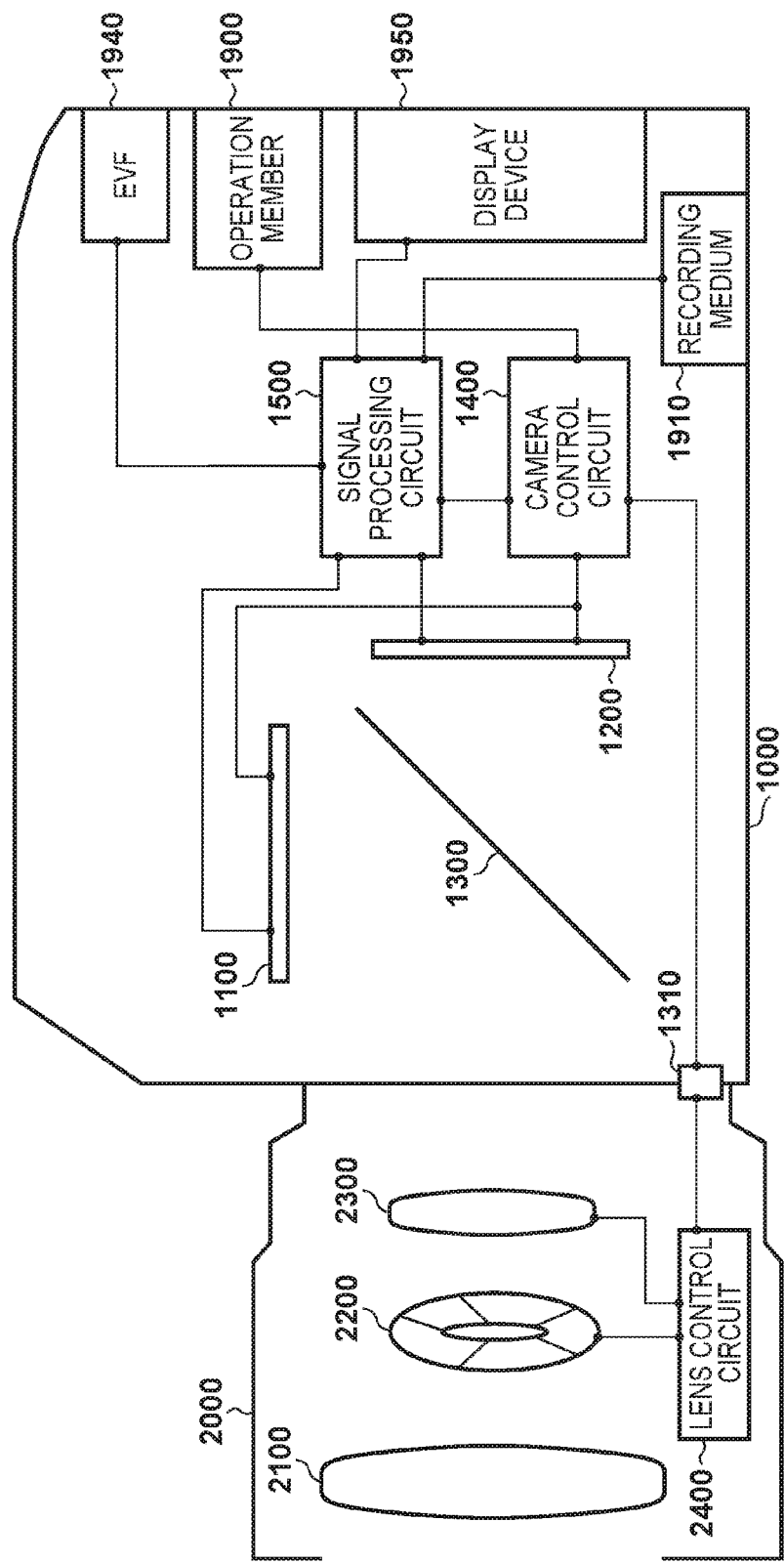
FIG. 1 is a block diagram showing an example of a functional configuration of a digital camera according to embodiments of the present invention.

FIG. 1 is a block diagram schematically showing the functional configuration of a digital camera 1000 common to embodiments of the present invention.

The digital camera 1000 has a first image sensor 1100, a second image sensor 1200, a half mirror 1300 that divides incident light from an imaging lens 2000 in two directions, a camera control circuit 1400, a signal processing circuit 1500, and an operation member 1900.

Also, the imaging lens 2000 has a condenser lens 2100, a diaphragm 2200, a focus lens 2300 and a lens control circuit 2400. The lens control circuit 2400 and the camera control circuit 1400 can communicate with each other via a lens communication terminal 1310. The imaging lens 2000 may be removable from the digital camera 1000, or may be fixed to the digital camera 1000.

The operation member 1900 collectively represents a group of input devices used by a user to input an instruction to the digital camera 1000. For example, the operation member 1900 may include not only input devices that require a physical operation such as switches, buttons, a lever and a touch panel, but also input devices that receive sound input and eye-gaze input. The digital camera 1000 of this embodiment has a switch (SW1) that is turned on by pressing a release button included in the operation member 1900 at half-stroke, and a switch (SW2) that is turned on by pressing the release button at full stroke. Note that the release button is used for capturing still images, and a moving image recording button is separately provided in order to capture moving images.

Turning on the switch SW1 makes an instruction to start a capturing preparation operation. The capturing preparation operation includes AF (autofocus) processing and AE (automatic exposure) processing. AE processing and AF processing can be implemented by the camera control circuit 1400 based on information obtained from an image to be displayed as a live view, for example.

Also, turning ON the switch SW2 makes an instruction to start an operation of capturing an image to be recorded. The image to be recorded is generated in the same manner as the image to be displayed except that the resolution is different. After the signal processing circuit 1500 performs encoding processing as necessary, the camera control circuit 1400 stores the image in a data file corresponding to the recording format, and records the image in a recording medium 1910.

The signal processing circuit 1500 applies preprocessing such as correlated double sampling and γ correction and developing processing such as white balance adjustment and demosaicing to image signals output by the first image sensor 1100 and the second image sensor 1200, and generates a full-color image. The signal processing circuit 1500 also applies image reducing processing to an image to be displayed such as a live view image, and applies encoding processing corresponding to the recording format to an image to be recorded. In addition, decoding processing required to display an image recorded in the recording medium 1910 is also executed by the signal processing circuit 1500. The image to be displayed can be displayed on an electronic view finder (EVF) 1940 and a display device 1950. In addition, the recording medium 1910 is a nonvolatile storage device such as a semiconductor memory card or an SSD. The recording medium 1910 may be removable or built-in.

The signal processing circuit 1500 can further execute various types of image processing including signal format conversion such as RGB-YCbCr conversion, image compositing, color tone adjustment, AF evaluation value generation, processing for detecting and recognizing a specific subject, and the like. A typical specific subject is a face of a person, and processing for recognizing a specific subject involves recognizing a facial expression and an individual, but the present invention is not limited thereto.

Figure 2:
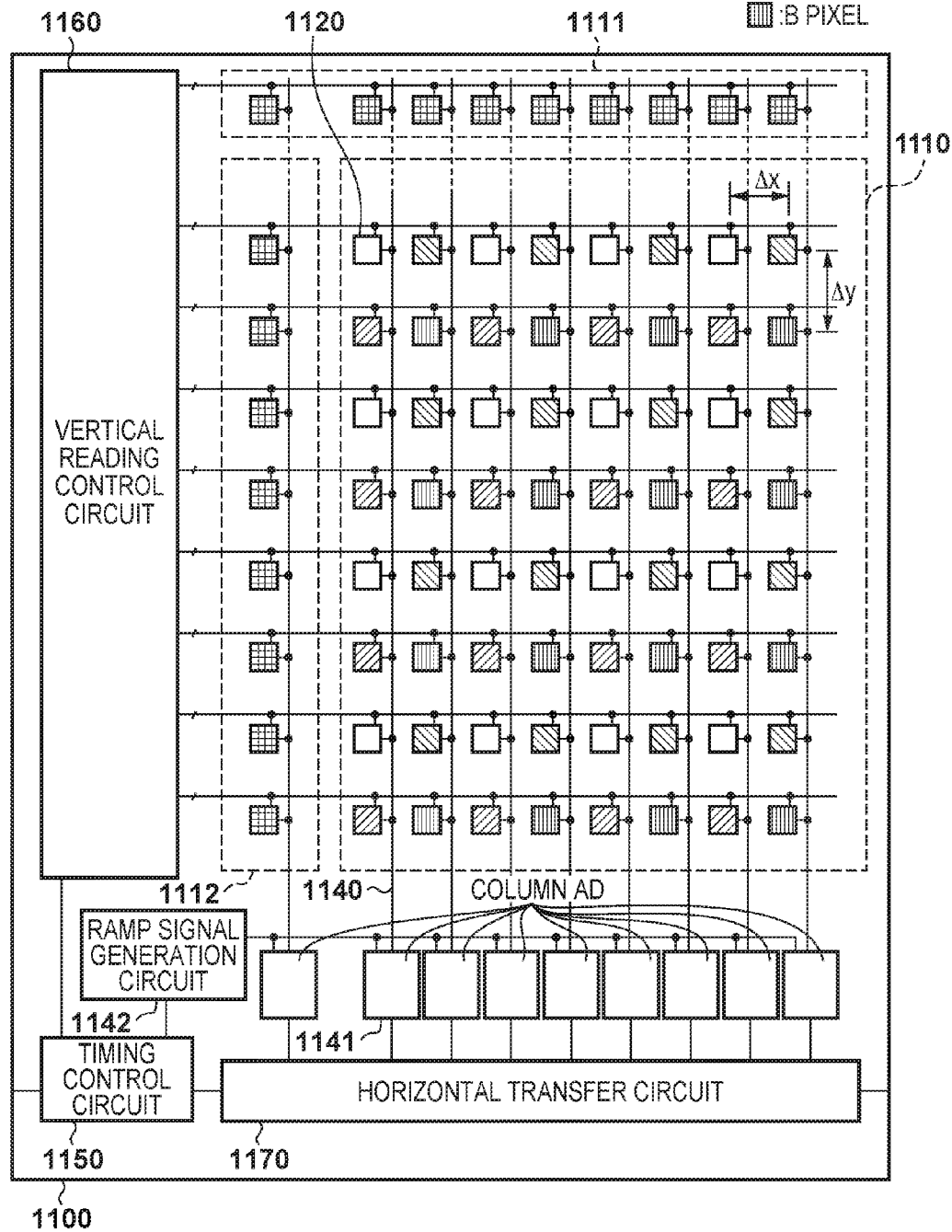
FIG. 2 is a schematic diagram of a configuration example of an image sensor according to the embodiments.

FIG. 2 is a schematic diagram showing a configuration example of the first image sensor 1100. A large number of pixels 1120 are two dimensionally arranged in a matrix. The pixels 1120 include effective pixels used for capturing images, and optical black pixels (OB pixel) used for correction. Effective pixels are arranged in an effective pixel portion 1110, and OB pixels are arranged in a horizontal OB pixel portion 1112 and a vertical OB pixel portion 1111.

The effective pixels are provided with a color filter in the primary color Bayer array. In FIG. 2, R pixels are pixels provided with a red (R) color filter. B pixels are provided with a blue (B) color filter. Both Gr pixels and Gb pixels are pixels provided with a green (G) filter, but G pixels adjacent to R pixels in the horizontal direction are referred to as Gr pixels, and G pixels adjacent to B pixels in the horizontal direction are referred to as Gb pixels.

Note that in the following description, the horizontal direction is the direction orthogonal to vertical transfer lines 1140, and the vertical direction is the direction parallel to the vertical transfer lines 1140. Also, an interval Δx between effective pixels in the horizontal direction is referred to as a horizontal pixel pitch, and an interval Δy in the vertical direction is referred to as a vertical pixel pitch. In this embodiment, the horizontal pixel pitch and the vertical pixel pitch are the same (Δx=Δy).

The OB pixel has a structure in which the photodiode (photoelectric conversion portion) of the pixel is shielded from light by aluminum wiring or the like. The vertical OB pixel portion 1111 may include OB pixels configured not to include a photodiode.

A vertical transfer line 1140 and a column AD converter 1141 are provided for each row of pixels 1120. A ramp signal generated by a ramp signal generation circuit 1142 is input to each of the column AD converters 1141. A vertical reading control circuit 1160 outputs a signal for selecting pixels in units of rows. A horizontal transfer circuit 1170 outputs pixel signals output by the column AD converters 1141 so as to transfer those signals in the horizontal direction. A timing control circuit 1150 generates operation timing signals for the vertical reading control circuit 1160, the ramp signal generation circuit 1142, and the horizontal transfer circuit 1170.

The pixel 1120 has a photodiode that converts light into electric charge and a floating diffusion (FD) that accumulates the electric charge generated by the photodiode and converts the electric charge into a voltage. The column AD converter 1141 receives a voltage output from the ramp signal generation circuit 1142 and compares this voltage with the voltage value of the FD of the pixel 1120 connected to the vertical transfer line 1140, thereby performing A/D conversion on the voltage of the FD.

Note that readout of the pixels 1120 is executed in the following cycle in order to suppress the influence of noise. First, readout is performed in a state in which the FD is reset, and an N signal is obtained and held in the horizontal transfer circuit 1170. After that, electric charge converted by the photodiode is transferred to the FD, readout is performed again and an S signal is obtained. The influence of noise can be suppressed by obtaining an (S-N) signal acquired by subtracting the N signal from the S signal in the horizontal transfer circuit 1170.

The vertical reading control circuit 1160 sequentially selects pixel rows, and reads the pixels included in the selected pixel rows, whereby signals can be read from all the pixels. Note that the readout operation up to A/D conversion is controlled by a timing signal generated by the timing control circuit 1150. The electric charge accumulating time (exposure duration) is determined in accordance with AE control performed by the camera control circuit 1400 or user settings made via the operation member 1900. The camera control circuit 1400 transmits the determined electric charge accumulating time to the timing control circuit 1150. The timing control circuit 1150 generates timing signals that are based on the electric charge accumulating time.

In this embodiment, the second image sensor 1200 may have the same configuration as the first image sensor 1100 except that pixel pitches Δx and Δy are different. Here, the horizontal pixel pitch of the first image sensor 1100 is expressed as $\Delta x_1$, the vertical pixel pitch of the first image sensor 1100 is expressed as $\Delta y_1$, the horizontal pixel pitch of the second image sensor 1200 is expressed as $\Delta x_2$, and the vertical pixel pitch of the second image sensor 1200 is expressed as $\Delta y_2$. In this embodiment, $\Delta x_1 > \Delta x_2$, $\Delta y_1 > \Delta y_2$, $\Delta x_i = \Delta y_1$ and $\Delta x_2 = \Delta y_2$. Note that in the first image sensor 1100 having a larger pixel pitch, the area dimension of the photodiode (photoelectric conversion area) of a pixel can be made larger than the area dimension of the photoelectric conversion area of a pixel of the second image sensor. The increase in the area dimension of the photoelectric conversion area expands the dynamic range of the pixel and improves the S/N ratio as well.

Note that the above-described pixel pitch relationship may also be realized by a pixel readout method. Specifically, the above-described pixel pitch relationship can be realized also by thinning more pixel columns and more pixel rows in the second image sensor 1200 than in the first image sensor 1100 and then reading the pixels, or adding more pixel columns and more pixel rows in the second image sensor 1200 than in the first image sensor 1100 and then reading the pixels. That is, the above-described pixel pitch relationship can be realized also by changing the sampling period of a subject image projected on the image sensor.

The pixel pitch that is realized by the readout method is referred to as the reading pixel pitch in order to be distinguished from the physical pixel pitch. Moreover, the reading pixel pitch of the first image sensor 1100 is expressed as $\Delta x'_1$, $\Delta y'_1$, and the reading pixel pitch of the second image sensor 1200 is expressed as $\Delta x'_2$, $\Delta y'_2$.

Note that in this embodiment, the first image sensor 1100 and the second image sensor 1200 have a different physical pixel pitch, and all the pixels are read from both the image sensors. Therefore, $\Delta x'_1 = \Delta x_1$, $\Delta y'_1 = \Delta y_1$, $\Delta x'_2 = \Delta x_2$, and $\Delta y'_2 = \Delta y_2$.

Figure 3A:
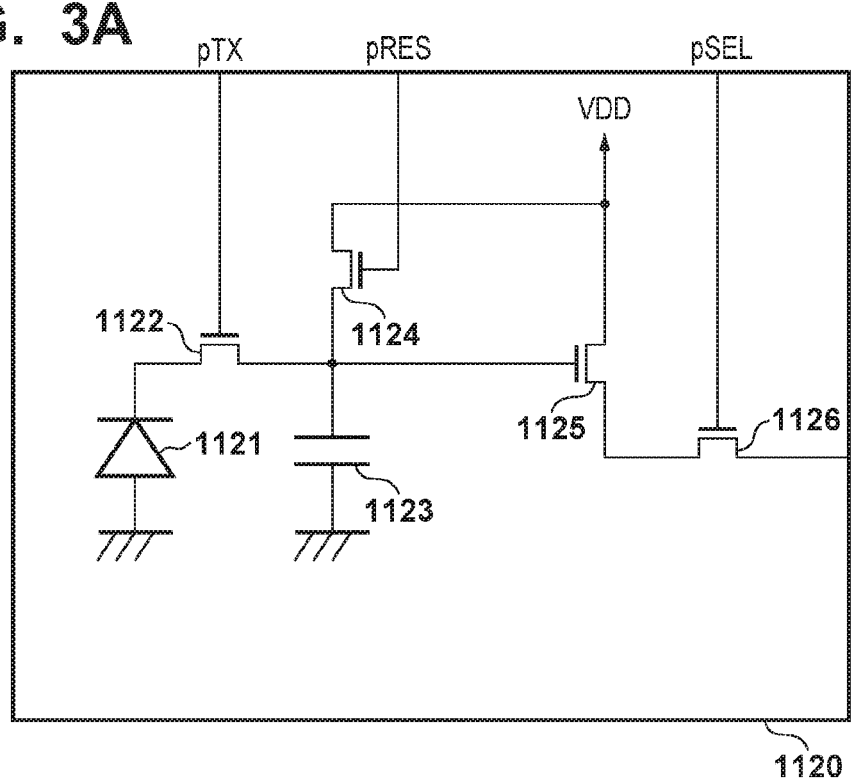
FIGS. 3A and 3B are circuit diagrams of a pixel in first and second embodiments.

FIG. 3A is a circuit diagram of the pixel 1120. The pixel 1120 is constituted by a photodiode 1121, a transfer transistor (Tr) 1122, a floating diffusion (FD) 1123, a reset Tr 1124, a pixel amplifier 1125 and a row selection Tr 1126. Pixel signal readout control is performed using a control signal pTX, an FD reset signal pRE and a row selection signal pSEL output by the vertical reading control circuit 1160.

The operation of the pixel 1120 is controlled as follows. First, the control signal pTX and the FD reset signal pRES are asserted and the photodiode 1121 and the FD 1123 are reset. Negating the control signal pTX after the reset is complete starts an accumulation period, and the photodiode 1121 accumulates electric charge (light signal) generated by light that enters during the accumulation period.

When the predetermined accumulation period has elapsed, by negating the FD reset signal pRES and asserting the row selection signal pSEL, a reset voltage amplified by the pixel amplifier 1125 is input to the column AD converter 1141 via the vertical transfer line 1140 and is converted into a digital signal. This signal is referred to as an N signal. The N signal is saved in the horizontal transfer circuit 1170.

Next, the control signal pTX is asserted, and the electric charge accumulated in the photodiode 1121 is transferred to the FD 1123 and converted into a voltage. The voltage of the FD 1123 is amplified by the pixel amplifier 1125, is then input to the column AD converter 1141 via the vertical transfer line 1140, and is converted into a digital signal. This signal is referred to as an S signal. The S signal is a digital signal that is based on the electric charge accumulated in the photodiode 1121. The influence of noise can be suppressed by subtracting the N signal from the S signal in the horizontal transfer circuit 1170.

Next, the operations of the column AD converter 1141 will be described with reference to the timing chart in FIG. 4A.

The column AD converter 1141 has a comparator to which a voltage of the vertical transfer line 1140 and a ramp signal output by the ramp signal generation circuit 1142 are input, and a counter to which AD clocks are input. If the voltage of the ramp signal is less than or equal to the voltage of the vertical transfer line 1140, the comparator outputs a Low level, and if the voltage of the ramp signal exceeds the voltage of the vertical transfer line 1140, outputs a High level.

The ramp signal generation circuit 1142 outputs a ramp signal whose voltage value increases at a predetermined rate per unit time during a period in which a ramp enable signal from the timing control circuit 1150 is at a High level. The ramp signal generation circuit 1142 also outputs a reference voltage (e.g., GND) during a period in which the ramp enable signal is at a Low level.

Before A/D conversion of a reset voltage, the ramp enable signal is at a Low level and the voltage of the vertical transfer line 1140 is a reset voltage, and thus the comparator output is at a Low level. When the ramp enable signal reaches a High level, the voltage of the ramp signal increases, and when the voltage of the ramp signal exceeds the reset voltage, the comparator output will be at a High level.

The number of AD clocks from the time when the ramp enable signal reaches a High level until the comparator output reaches a High level is counted by the counter. This count value is a digital value indicating the voltage of the vertical transfer line 1140. If the voltage of the vertical transfer line 1140 is a reset voltage, the digital value of the N signal is obtained.

When the comparator output reaches a High level, the count value (the N signal) is read out. Moreover, the timing control circuit 1150 lowers the ramp enable signal to a Low level. Accordingly, the voltage of the ramp signal falls to the reset voltage or lower again, and thus the comparator output will be at a Low level.

After the accumulation period has elapsed, when the voltage of the light signal converted by the FD is transferred to the vertical transfer line 1140, the timing control circuit 1150 raises the ramp enable signal to a High level. Accordingly, the voltage of the ramp signal starts to increase, and the counter starts counting the AD clocks. When the voltage of the ramp signal exceeds the voltage of the light signal, the comparator output will be at a High level. The count value of the AD clocks from the time when the ramp enable signal reaches a High level until the comparator output reaches a High level is read out as an S signal.

FIG. 4B is a timing chart showing an operation example of the column AD converter 1141 in the case where the voltage increase rate (voltage increase amount per unit time) of the ramp signal is greater than that in FIG. 4A. There is no difference in the operations of the column AD converter 1141 between FIG. 4A and FIG. 4B, but the increase in the voltage increase rate of the ramp signal shortens the time required for A/D conversion of the voltage of the vertical transfer line 1140.

On the other hand, the voltage per count value (quantization step) increases, and thus the resolution of A/D conversion, in other words, the number of tones of the image decreases.

In the following description, for the sake of convenience, the A/D conversion operation shown in FIG. 4A is referred to as the "AD high-resolution" mode, and the A/D conversion operation shown in FIG. 4B is referred to as the "AD high-speed" mode. It should be noted that the terms "high-resolution" and "high-speed" merely indicate a relative relationship.

In this embodiment, the pixel pitch of the first image sensor 1100 is greater than that of the second image sensor 1200, and thus the number of pixels that are read for each frame is lower in the first image sensor 1100 than that in the second image sensor 1200. Therefore, signals read out from the pixels of the first image sensor 1100 are A/D converted in the AD high-resolution mode. On the other hand, signals read out from the pixels of the second image sensor 1200 are A/D converted in the AD high-speed mode.

Note that the voltage increase rate of the ramp signal used in the AD high-resolution mode and the AD high-speed mode can be determined with consideration given to the difference in processing time caused by the difference in the numbers of pixels read out from the first image sensor 1100 and the second image sensor 1200, for example. For example, the determination can be made such that the processing executed on the image signals read out from each of the first image sensor 1100 and the second image sensor 1200 ends within a predetermined time. For example, in the case of concurrently capturing moving images with the first image sensor 1100 and the second image sensor 1200 at the same frame rate, the voltage increase rate of the ramp signal can be determined such that the processing for the image signals read out from each of the image sensors ends in one frame cycle.

FIG. 5 is a diagram schematically showing a state in which a point image formed by the condenser lens 2100 is projected on the image capturing planes of the first image sensor 1100 and the second image sensor 1200. Dotted lines in FIG. 5 schematically indicate a luminous beam. The luminous beam that passes through the condenser lens 2100 is divided into two optical paths by the half mirror 1300. The point image formed by the condenser lens 2100 is projected both on the first image sensor 1100 as a point image 3100 centered on an effective pixel (1, 4) and on the second image sensor 1200 as a point image 3200 centered on an effective pixel (9, 8). Here, the coordinates of a pixel are expressed as (a column number, a row number).

Note that the misalignment of the first image sensor and the second image sensor relative to the optical axis of the condenser lens 2100 is ignored in FIG. 5, but there is actually misalignment caused by assembly error during production.

FIG. 6A is a diagram schematically showing a misalignment amount between the image forming plane (x-z plane) of the first image sensor 1100 and the image forming plane (x-y plane) of the second image sensor 1200. Hereinafter, similarly to the description with reference to FIG. 2, the direction orthogonal to the vertical transfer lines of the image sensor is assumed to be the horizontal direction, and the direction parallel to the vertical transfer lines is assumed to be the vertical direction.

The distance in the horizontal direction from the effective pixel center of the first image sensor 1100 to the intersection (the optical axis center) between the optical axis of the imaging lens 2000 and the image capturing plane is denoted by Dh1, and the distance in the vertical direction is denoted by Dv1. Moreover, the angle deviation between the erect image direction in the case where an object facing the digital camera 1000 is projected on the image capturing plane and the vertical direction of the first image sensor 1100 is denoted by Da1.

Similarly, the distance in the horizontal direction from the effective pixel center of the second image sensor 1200 to the optical axis center of the imaging lens 2000 is denoted by Dh2, and the distance in the vertical direction is denoted by Dv2. Moreover, the angle deviation between the erect image direction in the case where an object facing the digital camera 1000 is projected on the image capturing plane and the vertical direction of the second image sensor 1200 is denoted by Da2.

The absolute misalignment amounts between the effective pixel center and the optical axis, namely, the distance Dh1, the distance Dv1, the angle deviation Da1, the distance Dh2, the distance Dv2 and the angle deviation Da2 are minimized to a targeted error range at the time of assembly.

Assembly error between images captured with the second image sensor 1200 and the first image sensor 1100 can be corrected by performing affine transformation processing for each color component using the differences in misalignment amount after the assembly, namely, Dh2-Dh1, Dv2-Dv1 and Da2-Da1 as parameters.

The parameters Dh2-Dh1, Dv2-Dv1 and Da2-Da1 are registered as alignment adjustment values in a nonvolatile memory of the camera control circuit 1400 at the time of the production such that the parameters can be read out and used at the time of correction, for example. A reference chart of the above-described parameters (alignment adjustment values) can be calculated from an image captured with the first image sensor 1100 and an image captured with the second image sensor 1200.

Furthermore, FIG. 6B is a diagram schematically showing the angle deviation amount between the optical axis of the imaging lens 2000 and the image forming plane (the x-z plane) of the first image sensor 1100 and an angle deviation amount between the optical axis of the imaging lens 2000 and the image forming plane (the x-y plane) of the second image sensor 1200.

The angle formed by the vertical axis of the first image sensor 1100 (an axis parallel to the vertical transfer lines 1140 in FIG. 2) and the optical axis is denoted by $D\theta1$, and the angle formed by a horizontal axis orthogonal to the vertical axis and the optical axis is denoted by $D\varphi1$. Similarly, the angle formed by the vertical axis of the second image sensor 1200 and the optical axis is denoted by $D\theta2$, and the angle formed by a horizontal axis orthogonal to the vertical axis and the optical axis is referred to as $D\varphi2$. The ideal values of the angles $D\theta1$, $D\varphi1$, $D\theta2$ and $D\varphi2$ are all 90°.

In this embodiment, the influence of relative angle deviation between the first image sensor 1100 and the second image sensor 1200, namely, $D\theta2$-$D\theta1$ and $D\varphi2$-$D\varphi1$ is corrected in addition to the misalignment relative to the optical axis shown in FIG. 6A.

A relative angle deviation amount causes difference in direction between a light beam incident on the first image sensor 1100 and a light beam incident on the second image sensor 1200, and causes two-dimensional optical shading that is different between the image sensors. This difference of optical shading can be reduced by applying, to each of the pixels, a gain correction amount obtained from the difference between images captured with both the image sensors using a light source for calibration at the time of production. The gain correction amount obtained from angle deviation is also registered as an adjustment value, for example, in the nonvolatile memory of the camera control circuit 1400 at the time of the production such that the gain correction amount can be read out and used at the time of correction.

FIG. 7 is a diagram schematically showing an overview of data processing in this embodiment, along with an example of the functional configuration of the signal processing circuit 1500. First RAW image data 1510 is input from the first image sensor 1100 to the signal processing circuit 1500, and second RAW image data 1520 is input from the second image sensor 1200 to the signal processing circuit 1500. The first image data 1510 and the second image data 1520 may be data of still images or moving image frames that have been captured concurrently.

Note that RAW image data is image data obtained using an image sensor provided with a color filter, and refers to image data that has not undergone color interpolation processing. Therefore, each of the pixels of the first RAW image data 1510 and the second RAW image data 1520 has only one color component out of a plurality of color components that constitute the color filter (excluding defective pixels or pixels handled as defective pixels). Hereinafter, for the sake of simplification, the first RAW image data 1510 and the second RAW image data 1520 are simply referred to as first image data 1510 and second image data 1520 respectively. Note that such image data may have undergone correction for reducing the influence of variations in properties between column AD converters 1141, correction for compensating the difference in sensitivity of each color, and the like, as long as the pixels of the image data have not undergone color interpolation processing. The image data may also have undergone correction of defective pixels, and correction for improving the linearity of the input/output properties of the image sensor.

An alignment processing circuit 1502 corrects misalignment relative to the optical axis center and angle deviation from the optical axis, which have been described with reference to FIGS. 6A and 6B. Specifically, the alignment processing circuit 1502 reads out an alignment adjustment value and a gain correction amount stored in the nonvolatile memory in the camera control circuit 1400, performs affine transformation on either the first image data 1510 or the second image data 1520, and applies the gain correction amount to either the first image data 1510 or the second image data 1520. The image data to which affine transformation and the gain correction amount are applied is determined according to the method by which the stored alignment adjustment value and gain correction amount were calculated. In the example in FIG. 7, both affine transformation and the gain correction amount are applied to the second image data.

Next, a resolution conversion circuit 1503 generates third image data 1525 acquired by resizing the second image data 1520 so as to have a resolution that is C times the resolution of the first image data 1510 (C is a power of 2) both in the horizontal and the vertical directions. When the resolution in each of the horizontal and vertical directions increases by a factor of C, the reading pixel pitch in each of the horizontal and the vertical directions decreases by 1/C.

When the reading pixel pitch $\Delta x'_2$ of the second image data 1520 is greater than a target pixel pitch (a pixel pitch corresponding to C times the resolution of the first image data 1510), the resolution conversion circuit 1503 reduces the second image data 1520 so as to generate the third image data 1525. Also, when the reading pixel pitch $\Delta x'_2$ of the second image data 1520 is smaller than the target pixel pitch, the resolution conversion circuit 1503 enlarges the second image data 1520 so as to generate the third image data 1525.

Note that when the reading pixel pitch $\Delta x'_2$ of the second image data 1520 is equal to the target pixel pitch, the second image data 1520 does not need to be resized, and it suffices to use the second image data 1520 as the third image data 1525 without any change. Various known methods such as a bilinear method and a bicubic method can be used to resize image data.

In this embodiment, as shown in FIG. 7, the target pixel pitch is set to a pixel pitch $\frac{1}{2}\Delta x'_1$, $\frac{1}{2}\Delta y'_1$ corresponding to twice the resolution of the first image data 1510 (C=2). Therefore, letting the reading pixel pitch of the third image data 1525 be $\Delta x'3$, $\Delta y'3$, then $\Delta x'3=(\Delta x'_1)/2$ and $\Delta y'3=(\Delta y'_1)/2$ hold. The resolution conversion circuit 1503 inputs the first image data 1510 and the third image data 1525 that has been acquired by resizing the second image data 1520, to a reference interpolation circuit 1501.

The reference interpolation circuit 1501 applies demosaicing to the first image data 1510, and generates a full-color image 1530. In this embodiment, the other image data having a different reading pixel pitch is used for demosaicing the first image data 1510. In the present specification, this demosaicing is referred to as "reference interpolation", and a specific method thereof will be described below.

The positional relation between a pixel to be interpolated and pixels used for interpolating the pixel to be interpolated will be described with reference to FIGS. 8A and 8B.

The positions of pixels regularly arranged in an image sensor in a two-dimensional manner can be expressed as (n, m) using two integers, considering the pixel pitch as a unit. In this embodiment, the coordinates of a pixel are expressed as (a horizontal coordinate, a vertical coordinate), and the coordinates of the pixel arranged at the upper left end in an effective pixel portion are assumed to be (0, 0).

Figure 8A:
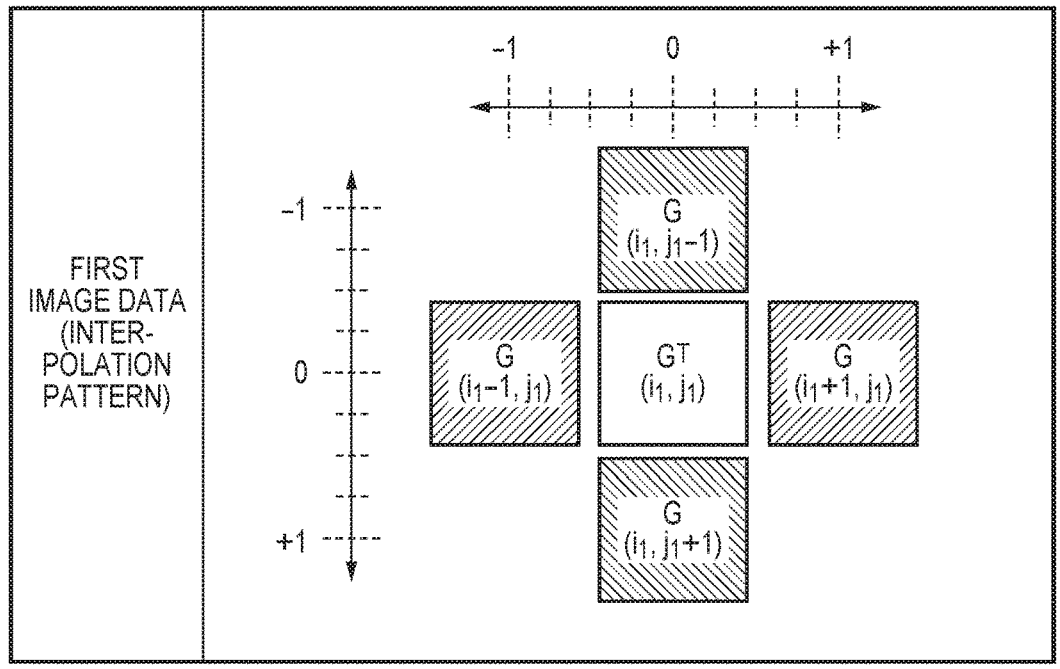
FIGS. 8A and 8B are diagrams illustrating the coordinate relation of G pixels in a reference interpolation circuit in the embodiments.

FIG. 8A shows a portion of a G plane acquired by extracting the G pixels in the first image sensor 1100. Here, a central area adjacent to four G pixels has a B pixel or an R pixel, and thus has no G component. Hereinafter, this central area is assumed to have a virtual G pixel $G^T$ to be interpolated. Also, the central coordinates of the pixel $G^T$ are assumed to be $(i_1, j_1)$, and the reading pixel pitches of the first image sensor 1100 both in the horizontal direction and the vertical direction are assumed to be 1.

Accordingly, G pixels adjacent to and above, below, on the left of and on the right of the pixel $G^T$ can be respectively expressed as $G(i_1, j_1-1)$, $G(i_1, j_1+1)$, $G(i_1-1, j_1)$ and $G(i_1+1, j_1)$.

In addition, the position in the third image data 1525 corresponding to $G^T(i_1, j_1)$ is assumed to be at coordinates $(i_2, j_2)$. In the case of this embodiment, if the reading pixel pitch of the first image sensor 1100 is 1, then $i_2=2\times i_1$ and $j_2=2\times j_1$ hold. If the resolution conversion circuit 1503 performs C-times resolution conversion, then $i_2=C\times i_1$ and $j_2=C\times j_1$ hold.

The reference interpolation circuit 1501 stores, in a memory of the signal processing circuit 1500, the correspondence relation between the central coordinates $(i_1, j_1)$ of each of the pixels of the first image data 1510 and the coordinates $(i_2, j_2)$ of the third image data 1525, regarding each G pixel to be interpolated.

Figure 8B:
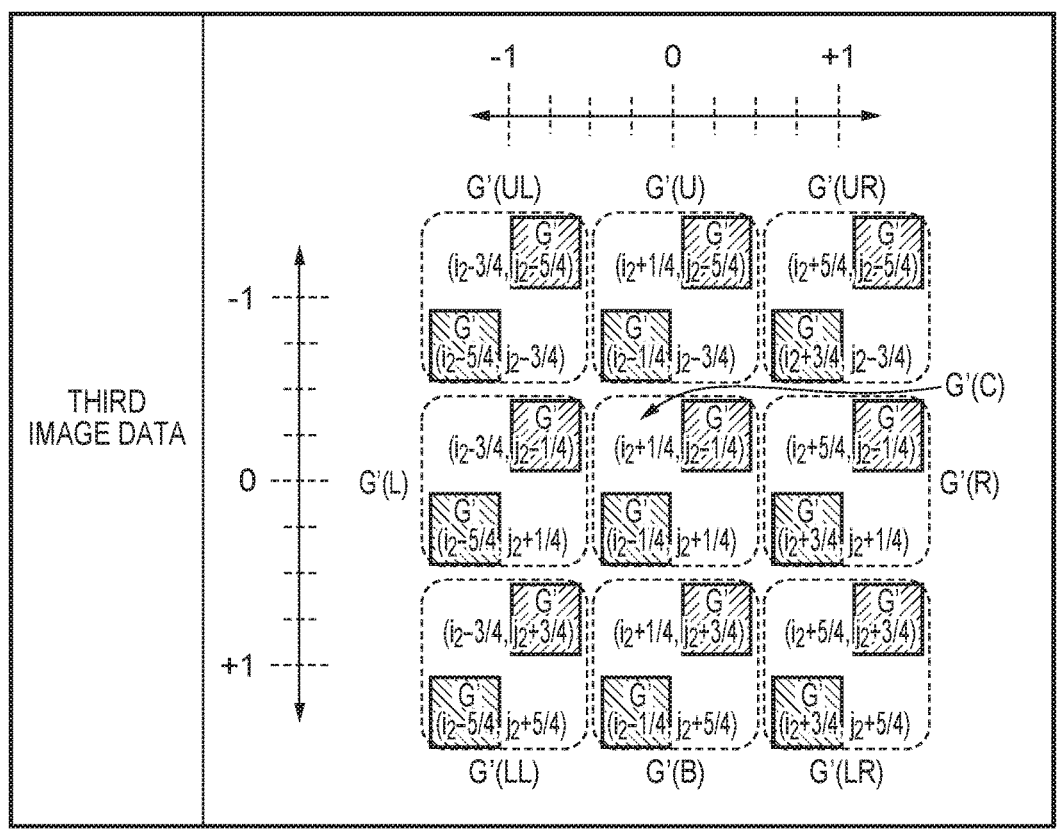

In this embodiment, as shown in FIG. 8B, there is no G pixel centered on the coordinates $(i_2, j_2)$ in the third image data 1525. The G pixels of the third image data 1525 are at positions shifted by ¼ of the reading pixel pitch of the first image data from the coordinates $(i_2, j_2)$ in the up-down and right-left directions.

The coordinate shifted from the coordinate $i_2$ in the left direction by ¼ is denoted by $i_2-¼$, and the coordinate shifted from the coordinate $i_2$ in the right direction by ¼ is denoted by $i_2+¼$. Also, the coordinate shifted from the coordinate $j_2$ in the upward direction by ¼ is denoted by $j_2-¼$, and the coordinate shifted in the downward direction by ¼ is denoted by $j_2+¼$.

Accordingly, the G pixels closest to the coordinates $(i_2, j_2)$ are G' $(i_2+¼, j_2-¼)$ shifted to the right by ¼ and upward by ¼, and G'$(i_2-¼, j_2+¼)$ shifted to the left by ¼ and downward by ¼.

In FIG. 8B, G' upper left (UL), G' up (U), G' upper right (UR), G' right (R), G' center (C), G' left (L), G' lower left (LL), G' below (B) and G' lower right (LR), each of which is enclosed by a dotted line so as to include two pixels, represent groups related to interpolation processing to be described later.

The reference interpolation circuit 1501 assumes the correspondence relation between first image data and third image data similarly regarding R pixels and B pixels.

The color filter is in the primary color Bayer array, and thus on the R plane, it is necessary to perform interpolation at the pixel positions of the B pixels, the Gr pixels and the Gb pixels. Interpolation is performed in a first interpolation pattern at the positions of the B pixels, in a second interpolation pattern at the positions of the Gr pixels, and in a third interpolation pattern at the positions of the Gb pixels.

Similarly, on the B plane, interpolation need to be performed at the pixel positions of the R pixels, the Gb pixels and the Gr pixels. Interpolation is performed in the first interpolation pattern at the positions of the R pixels, in the second interpolation pattern at the positions of the Gb pixels, and in the third interpolation pattern at the positions of the Gr pixels.

FIGS. 9A and 9B show the positional relation between a pixel to be interpolated and pixels used for interpolating the pixel to be interpolated, regarding the first interpolation pattern. In the following description as well, the coordinates of a pixel are expressed assuming that the reading pixel pitches in the horizontal direction and the vertical direction of the first image sensor 1100 are 1.

First, the positional relation of R pixels will be described. As shown on the left in FIG. 9A, the coordinates of the center of a virtual R pixel ($R^{T1}$) at a location in the first image sensor 1100 at which a B pixel is arranged are assumed to be $(i_1, j_1)$. Therefore, the R pixels adjacent to and on the upper left, lower left, upper right and lower right of the pixel $R^{T1}$ of the first image data 1510 are respectively $R(i_1-1, j_1-1)$, $R(i_1-1, j_1+1)$, $R(i_1+1, j_1-1)$, and $R(i_1+1, j_1+1)$. These are R pixels that are actually arranged.

Moreover, the position in the third image data 1525 corresponding to $RT(i_1, i_1)$ is assumed to be at the coordinates $(i_2, j_2)$. In the case of this embodiment, similarly to the case of the G pixels, $i_2=2\times i_1$ and $j_2=2\times j_1$ hold.

For each of the R pixels to be interpolated in the first interpolation pattern, the reference interpolation circuit 1501 stores, in the memory of the signal processing circuit 1500, the correspondence relation between the central coordinates $(i_1, j_1)$ of the pixel of the first image data 1510 and the coordinates $(i_2, j_2)$ in the third image data 1525.

In this embodiment, as shown on the left in FIG. 9B, there is no R pixel centered on the coordinates $(i_2, j_2)$ in the third image data 1525. The R pixels of the third image data 1525 are at positions shifted from the coordinates $(i_2, j_2)$ by ¼ of the reading pixel pitch of the first image data in the up-down direction and the right-left direction.

Therefore, the R pixel closest to the coordinates $(i_2, j_2)$ is R' $(i_2-¼, j_2-¼)$ shifted therefrom by ¼ to the left and by ¼ upward.

Next, the positional relation of B pixels will be described.

As shown on the right in FIG. 9A, the coordinates of the center of a virtual B pixel ($B^{T1}$) at a location in the first image sensor 1100 at which an R pixel is arranged are assumed to be $(i_1, j_1)$. Therefore, the B pixels adjacent to and on the upper left, lower left, upper right and lower right of the pixel $B^{T1}$ of the first image data 1510 are respectively $B(i_1-1, j_1-1)$, $B(i_1-1, j_1+1)$, $B(i_1+1, j_1-1)$ and $B(i_1+1, j_1+1)$. These are B pixels that are actually arranged.

Moreover, the position in the third image data 1525 corresponding to $B^T(i_1, j_1)$ is assumed to be at the coordinates $(i_2, j_2)$. In the case of this embodiment, similarly to the case of the G pixels, $i_2=2\times i_1$ and $j_2=2\times j_1$ hold.

For each of the B pixels to be interpolated in the first interpolation pattern, the reference interpolation circuit 1501 stores, in the memory of the signal processing circuit 1500, the correspondence relation between the central coordinates $(i_1, j_1)$ of the pixel of the first image data 1510 and the coordinates $(i_2, j_2)$ in the third image data 1525.

In this embodiment, as shown on the right in FIG. 9B, there is no B pixel centered on the coordinates $(i_2, j_2)$ in the third image data 1525. The B pixels of the third image data 1525 are at positions shifted from the coordinates $(i_2, j_2)$ by ¼ of the reading pixel pitch of the first image data in the up-down direction and the right-left direction.

Therefore, the B pixel that is closest to the coordinates $(i_2, j_2)$ is B' $(i_2-¼, j_2-¼)$ shifted therefrom by ¼ to the left and by ¼ upward.

In FIG. 9B, R' (UL), R' (U), R' (UR), R' (L), R' (C), R' (R), R' (LL), R' (B) and R' (LR), as well as B' (UL), B' (U), B' (UR), B' (L), B' (C), B' (R), B' (LL), B' (B) and B' (LR), each of which is enclosed by a dotted line, represent groups related to interpolation processing to be described later.

FIGS. 10A and 10B show the positional relation between a pixel to be interpolated and pixels used for interpolating the pixel to be interpolated, regarding the second interpolation pattern. In the following description as well, the coordinates of a pixel are expressed assuming that the reading pixel pitches in the horizontal direction and the vertical direction of the first image sensor 1100 are 1.

First, the positional relation of R pixels will be described. As shown on the left in FIG. 10A, the coordinates of the center of a virtual R pixel ($R^{T2}$) at a location in the first image sensor 1100 at which a Gr pixel is arranged is assumed to be $(i_1, j_1)$. Therefore, the pixel adjacent to and on the left of the pixel $R^{T2}$ of the first image data 1510 on the R plane is $R(i_1-1, j_1)$, and the pixel adjacent to and on the right of the pixel $R^{T2}$ is $R(i_1+1, j_1)$. The pixels adjacent to and above and below the pixel $R^{T2}$ are B pixels, and thus there is no R pixel. However, after interpolation in the first interpolation pattern is complete, $R^{*U}(i_1, j_1-1)$ and $R^{*B}(i_1, j_1+1)$ that have undergone interpolation can be used.

Moreover, the position in the third image data 1525 corresponding to $R^{T2}(i_1, j_1)$ is assumed to be at the coordinates $(i_2, j_2)$. In the case of this embodiment, similarly to the case of G pixels, $i_2=2\times i_1$ and $j_2=2\times j_1$ hold.

For each of the R pixels to be interpolated in the second interpolation pattern, the reference interpolation circuit 1501 stores, in the memory of the signal processing circuit 1500, the correspondence relation between the central coordinates $(i_1, j_1)$ of the pixel of the first image data 1510 and the coordinates $(i_2, j_2)$ in the third image data 1525.

In this embodiment, as shown on the left in FIG. 10B, there is no R pixel centered on the coordinates $(i_2, j_2)$ in the third image data 1525. The R pixels of the third image data 1525 are at positions shifted from the coordinates $(i_2, j_2)$ by ¼ of the reading pixel pitch of the first image data in the up-down direction and the right-left direction.

Therefore, the R pixel closest to the coordinates $(i_2, j_2)$ is R' $(i_2-¼, j_2-¼)$ shifted therefrom by ¼ to the left and by ¼ upward.

Next, the positional relation of B pixels will be described.

As shown on the right in FIG. 10A, the coordinates of the center of a virtual B pixel ($B^{T2}$) at a location in the first image sensor 1100 at which a Gb pixel is arranged are assumed to be $(i_1, j_1)$. Therefore, the pixel adjacent to and on the left of the pixel $B^{T2}$ of the first image data 1510 is $B(i_1-1, j_1)$, and the pixel adjacent to and on the right of the pixel $B^{T2}$ is $B(i_1+1, j_1)$. The pixels adjacent to and above and below the pixel $B^{T2}$ are R pixels, and there is no B pixel. However, after interpolation in the first interpolation pattern is complete, $B^{*U}(i_1, j_1-1)$ and $B^{*B}(i_1, j_1+1)$ that have undergone interpolation can be used.

Moreover, the position in the third image data 1525 corresponding to $B^{T2}(i_1, j_1)$ is assumed to be at the coordinates $(i_2, j_2)$. In the case of this embodiment, similarly to the case of G pixels, $i_2=2\times i_1$ and $j_2=2\times j_1$ hold.

For each of the B pixels to be interpolated in the second interpolation pattern, the reference interpolation circuit 1501 stores, in the memory of the signal processing circuit 1500, the correspondence relation between the central coordinates $(i_1, j_1)$ of the pixel of the first image data 1510 and the coordinates $(i_2, j_2)$ in the third image data 1525.

In this embodiment, as shown on the right in FIG. 10B, there is no B pixel centered on the coordinates $(i_2, j_2)$ in the third image data 1525. The B pixels of the third image data are at positions shifted from the coordinates $(i_2, j_2)$ by ¼ of the reading pixel pitch of the first image data in the up-down direction and the right-left direction.

Therefore, the B pixel closest to the coordinates $(i_2, j_2)$ is at B' $(i_2+¼, j_2+¼)$ shifted by ¼ to the right and by ¼ downward.

In FIG. 10B, R' (UL), R' (U), R' (UR), R' (L), R' (C), R' (R), R' (LL), R' (B) and R' (LR), as well as B' (UL), B' (U), B' (UR), B' (L), B' (C), B' (R), B' (LL), B' (B) and B' (LR), each of which is enclosed by a dotted line, represent groups related to interpolation processing to be described later.

Figure 11A:
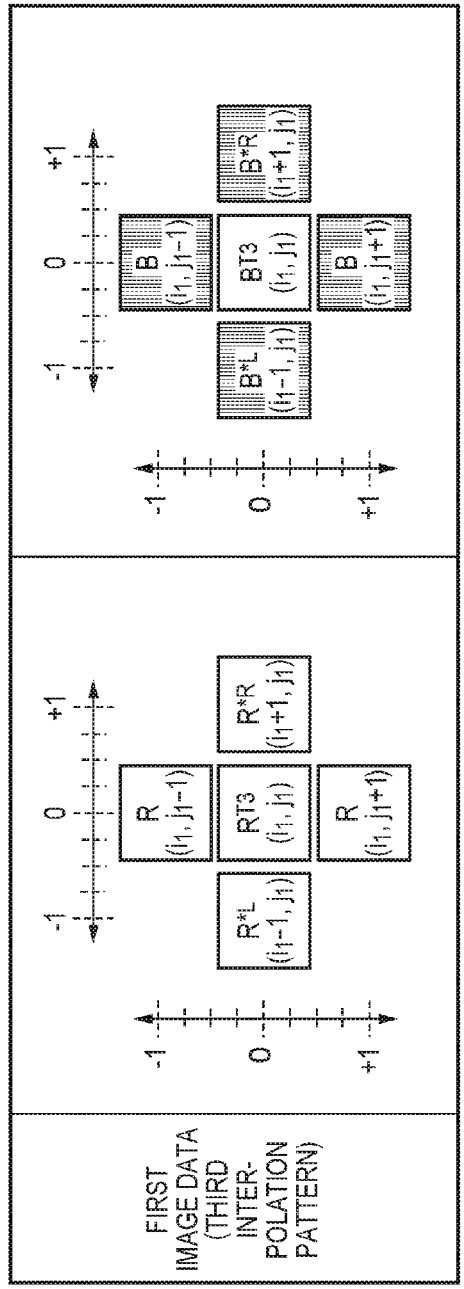
FIGS. 11A and 11B are diagrams illustrating the coordinate relation of R pixels and the coordinate relation of B pixels in a third interpolation pattern in the reference interpolation circuit in the embodiments.
Figure 11B:
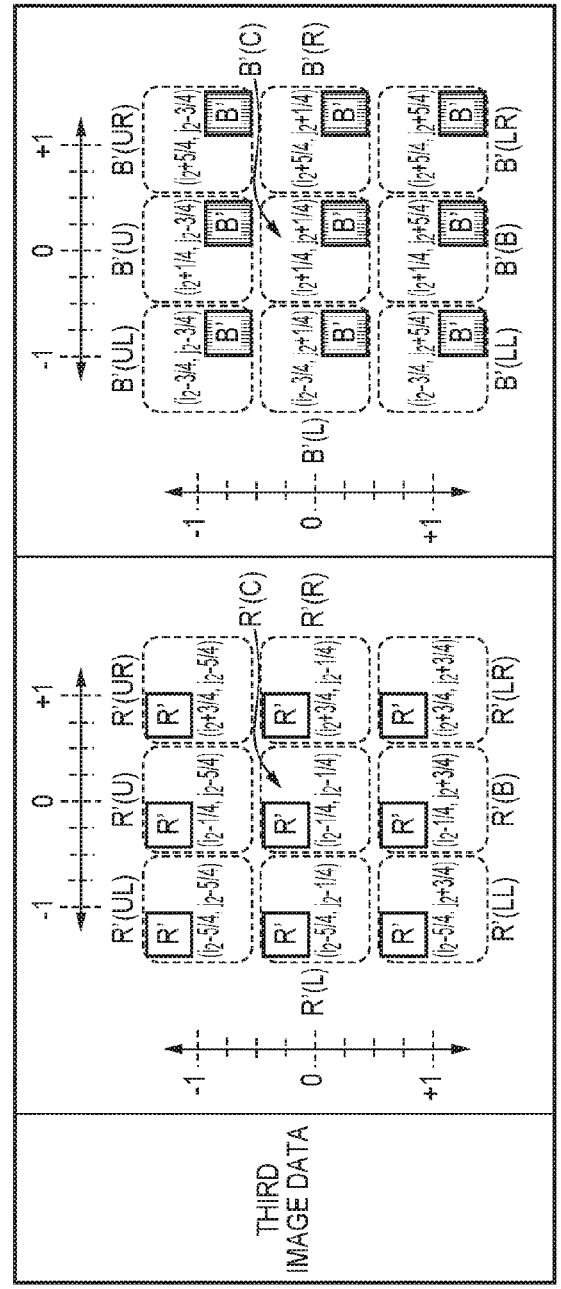

FIGS. 11A and 11B show the positional relation between a pixel to be interpolated and pixels used for interpolating the pixel to be interpolated, regarding the third interpolation pattern. Also in the following description, the coordinates of a pixel are expressed assuming that the reading pixel pitches in the horizontal direction and the vertical direction of the first image sensor 1100 are 1.

First, the positional relation of R pixels will be described.

As shown on the left in FIG. 11A, the coordinates of the center of a virtual R pixel ($R^{T3}$) at a location in the first image sensor 1100 at which a Gb pixel is arranged are assumed to be $(i_1, j_1)$. Therefore, on the R plane, the pixel adjacent to and above the pixel $R^{T3}$ of the first image data 1510 is $R(i_1, j_1-1)$, and the pixel adjacent to and below the pixel $R^{T3}$ is $R(i_1, j_1+1)$. The pixels adjacent to and on the right and left of $R^{T3}$ are B pixels, and thus there is no R pixel. However, after interpolation in the first interpolation pattern is complete, $R^{*L}(i_1-1, j_1)$ and $R^{*R}(i_1+1, j_1)$ that have undergone interpolation can be used.

Moreover, the position in the third image data 1525 corresponding to $R^{T3}(i_1, j_1)$ is assumed to be at the coordinates $(i_2, j_2)$. In the case of this embodiment, similarly to the case of G pixels, $i_2=2\times i_1$ and $j_2=2\times j_1$ hold.

For each of the R pixels to be interpolated in the third interpolation pattern, the reference interpolation circuit 1501 stores, in the memory of the signal processing circuit 1500, the correspondence relation between the central coordinates $(i_1, j_1)$ of the pixel of the first image data 1510 and the coordinates $(i_2, j_2)$ in the third image data 1525.

In this embodiment, as shown on the left in FIG. 11B, there is no R pixel centered on the coordinates $(i_2, j_2)$ in the third image data 1525. The R pixels of the third image data 1525 are at positions shifted from the coordinates $(i_2, j_2)$ by ¼ of the reading pixel pitch of the first image data in the up-down direction and the right-left direction.

Therefore, the R pixel closest to the coordinates $(i_2, j_2)$ is R' $(i_2-¼, j_2-¼)$ shifted therefrom by ¼ to the left and by ¼ upward.

Next, the positional relation of B pixels will be described.

As shown on the right in FIG. 11B, the coordinates of the center of a virtual B pixel ($B^{T3}$) at a location in the first image sensor 1100 at which a Gr pixel is arranged are assumed to be $(i_1, j_1)$. Therefore, the pixel adjacent to and above the pixel $B^{T3}$ of the first image data 1510 is $B(i_1, j_1-1)$, and the pixel adjacent to and below the pixel $B^{T3}$ is $B(i_1, j_1+1)$. The pixels adjacent to and on the left and right of the pixel $B^{T3}$ are R pixels, and thus there is no B pixel. However, after interpolation in the first interpolation pattern is complete, $B^{*L}(i_1-1, j_1)$ and $B^{*R}(i_1+1, j_1)$ that have undergone interpolation can be used.

Moreover, the position in the third image data 1525 corresponding to $B^{T3}(i_1, j_1)$ is assumed to be at the coordinates $(i_2, j_2)$. In the case of this embodiment, similarly to the case of G pixels, $i_2=2\times i_1$ and $j_2=2\times j_1$ hold.

For each of the B pixels to be interpolated in the third interpolation pattern, the reference interpolation circuit 1501 stores, in the memory of the signal processing circuit 1500, the correspondence relation between the central coordinates $(i_1, j_1)$ of the pixel of the first image data 1510 and the coordinates $(i_2, j_2)$ in the third image data 1525.

In this embodiment, as shown on the right in FIG. 11B, there is no B pixel centered on the coordinates $(i_2, j_2)$ in the third image data 1525. The B pixels of the third image data 1525 are at positions shifted from the coordinates $(i_2, j_2)$ by ¼ of the reading pixel pitch of the first image data in the up-down direction and the right-left direction.

Therefore, the B pixel closest to the coordinates $(i_2, j_2)$ is B' $(i_2+¼, j_2+¼)$ shifted therefrom by ¼ to the right and by ¼ downward.

In FIG. 11B, R' (UL), R' (U), R' (UR), R' (L), R' (C), R' (R), R' (LL), R' (B) and R' (LR), as well as B' (UL), B' (U), B' (UR), B' (L), B' (C), B' (R), B' (LL), B' (B) and B' (LR), each of which is enclosed by a dotted line, represent groups related to interpolation processing to be described later.

The operations of reference interpolation processing performed by the reference interpolation circuit 1501 will be described below with reference to the flowchart shown in FIG. 12.

In step S10, the reference interpolation circuit 1501 performs preprocessing on the third image data 1525 regarding G components (G plane). In this embodiment, the reference interpolation circuit 1501 performs, in demosaicing to be described later, adaptive interpolation that takes into consideration the values of the pixels surrounding, in the eight directions, the pixel to be interpolated.

The reference interpolation circuit 1501 assumes that the pixel to be interpolated in the first image data 1510 is the pixel $G^T(i_1, j_1)$, and that the pixel in the third image data 1525 corresponding to the coordinates of the pixel $G^T$ is G' (C). The reference interpolation circuit 1501 then calculates the value of the pixel G' (C) and the values of the pixels (G' (UL), G' (U), G' (UR), G' (L), G' (R), G' (LL), G' (B) and G'

(LR)) surrounding the pixel G' (C) in the eight directions, using G'(n, m) of the third image data 1525, in accordance with Expression 1 below.

$$G'(UL) = \left\{ G'\left(i_2 - \frac{5}{4}, j_2 - \frac{3}{4}\right) + G'\left(i_2 - \frac{3}{4}, j_2 - \frac{5}{4}\right) \right\} / 2 \quad (1)$$

$$G'(U) = \left\{ G'\left(i_2 - \frac{1}{4}, j_2 - \frac{3}{4}\right) + G'\left(i_2 + \frac{1}{4}, j_2 - \frac{5}{4}\right) \right\} / 2$$

$$G'(UR) = \left\{ G'\left(i_2 + \frac{3}{4}, j_2 - \frac{3}{4}\right) + G'\left(i_2 + \frac{5}{4}, j_2 - \frac{5}{4}\right) \right\} / 2$$

$$G'(L) = \left\{ G'\left(i_2 - \frac{5}{4}, j_2 + \frac{1}{4}\right) + G'\left(i_2 - \frac{3}{4}, j_2 - \frac{1}{4}\right) \right\} / 2$$

$$G'(C) = \left\{ G'\left(i_2 - \frac{1}{4}, j_2 + \frac{1}{4}\right) + G'\left(i_2 + \frac{1}{4}, j_2 - \frac{1}{4}\right) \right\} / 2$$

$$G'(R) = \left\{ G'\left(i_2 + \frac{3}{4}, j_2 + \frac{1}{4}\right) + G'\left(i_2 + \frac{5}{4}, j_2 - \frac{1}{4}\right) \right\} / 2$$

$$G'(LL) = \left\{ G'\left(i_2 - \frac{5}{4}, j_2 + \frac{5}{4}\right) + G'\left(i_2 - \frac{3}{4}, j_2 + \frac{1}{4}\right) \right\} / 2$$

$$G'(B) = \left\{ G'\left(i_2 - \frac{1}{4}, j_2 + \frac{5}{4}\right) + G'\left(i_2 + \frac{1}{4}, j_2 + \frac{1}{4}\right) \right\} / 2$$

$$G'(LR) = \left\{ G'\left(i_2 + \frac{3}{4}, j_2 + \frac{5}{4}\right) + G'\left(i_2 + \frac{5}{4}, j_2 + \frac{1}{4}\right) \right\} / 2$$

In step S20, the reference interpolation circuit 1501 calculates correction parameters related to a correction amount used in demosaicing of the pixel $G^T$, from the values of the nine pixels obtained in step S10. The reference interpolation circuit 1501 calculates correction parameters $\alpha 1$ to $\alpha 8$ from the difference between the value of the pixel G' (C) and the value of each of the eight surrounding pixels, in accordance with Expression 2 below.

$$\alpha_1 = G'(UL) - G'(C)$$

$$\alpha_2 = G'(U) - G'(C)$$

$$\alpha_3 = G'(UR) - G'(C)$$

$$\alpha_4 = G'(L) - G'(C)$$

$$\alpha_5 = G'(R) - G'(C)$$

$$\alpha_6 = G'(LL) - G'(C)$$

$$\alpha_7 = G'(B) - G'(C)$$

$$\alpha_8 = G'(LR) - G'(C) \quad (2)$$

In step S30, the reference interpolation circuit 1501 determines the similarity between the pixel G' (C) and the eight surrounding pixels, based on the magnitude of the correction parameter $\alpha_k$ (k=1, 2, 3, 4, 5, 6, 7 and 8) calculated in step S20. In this embodiment, the reference interpolation circuit 1501 determines that a pixel whose correction parameter $\alpha_k$, which is the difference in value from the pixel G' (C), takes a smaller value has a higher similarity, and calculates a correction parameter $\alpha'_k$ acquired by weighting the correction parameter $\alpha_k$ in accordance with the similarity.

Figure 13:
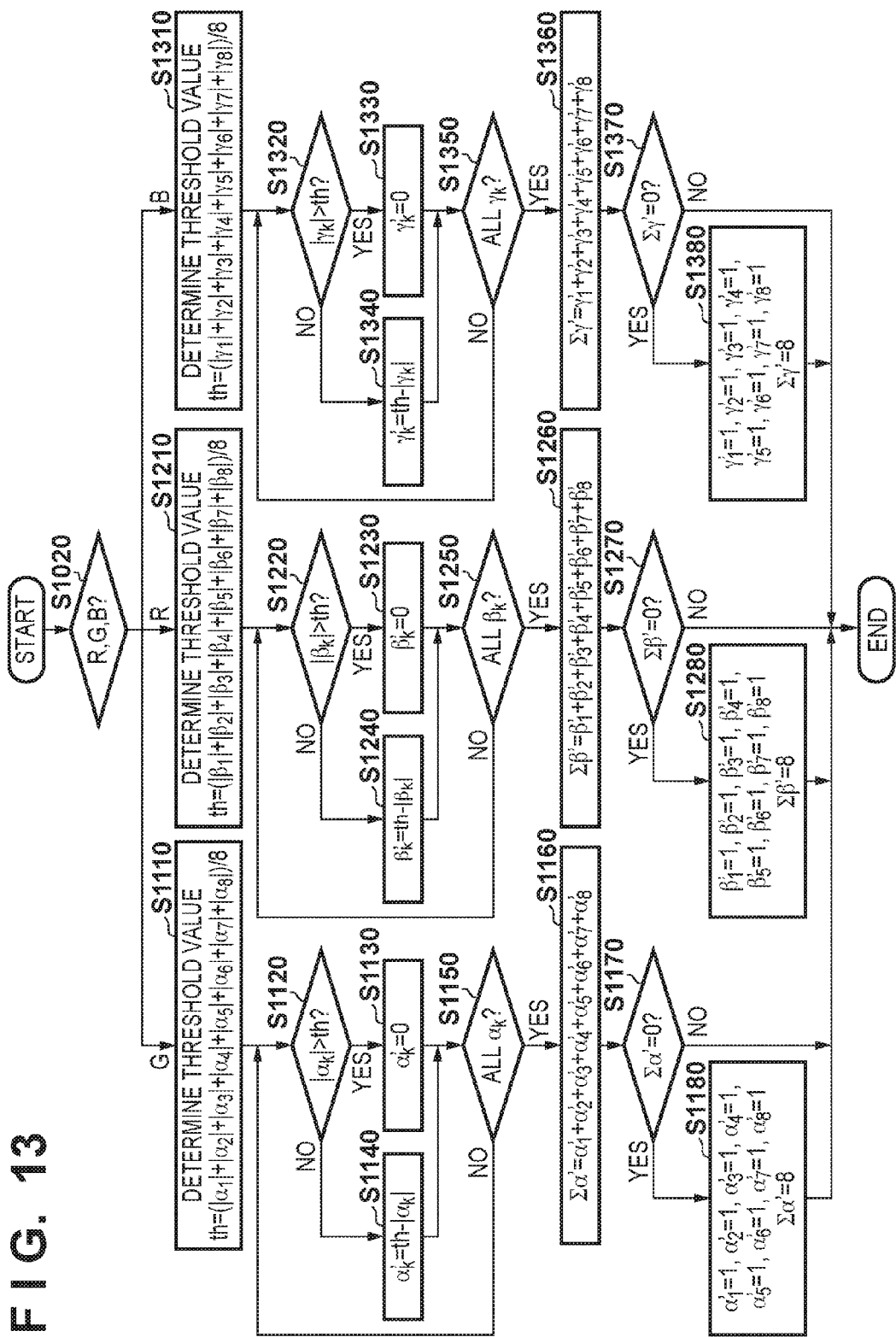
FIG. 13 is a flowchart of interpolation parameter calculation processing in the embodiments.

This processing will be described with reference to FIG. 13.

In step S1020, the reference interpolation circuit 1501 branches the processing in accordance with the color of the pixel to be corrected. First, the case of a G pixel will be described.

In step S1110, the reference interpolation circuit 1501 calculates a threshold value th used for calculating the correction parameter $\alpha'_k$ in accordance with Expression 3 below.

$$th = \frac{|\alpha_1| + |\alpha_2| + |\alpha_3| + |\alpha_4| + |\alpha_5| + |\alpha_6| + |\alpha_7| + |\alpha_8|}{8} \quad (3)$$

Expression 3 is an expression for obtaining the average value of the central pixel (G' (C)) and the eight peripheral pixels, in which the absolute value of the difference between the value of the central pixel (G' (C)) and the value of each of the eight peripheral pixels is regarded as the Euclidean distance between the central pixel and each of the peripheral eight pixels.

Subsequently, in the processing of steps S1120 to S1150, the reference interpolation circuit 1501 calculates the correction parameter $\alpha'_k$ for all the values of $\alpha_k$ by the operation of Expression 4 below that is based on the threshold value th.

$$\alpha'_k = \begin{cases} \text{if } th - |\alpha_k|(|\alpha_k| > th) \\ 0 \quad (|\alpha_k| \le th) \end{cases} \quad (4)$$

The similarity of the value of a peripheral pixel that satisfies $|\alpha_k| > th$ to the value of the central pixel that is to be interpolated is low. Therefore, the coefficient $\alpha'_k$ that is used for interpolation is set to zero, such that the pixel is excluded from interpolation processing.

Regarding a peripheral pixel that does not satisfy $|\alpha_k| > th$, the coefficient $\alpha'_k$ is set to $th - |\alpha_k|$. Accordingly, the higher the similarity of the peripheral pixel to the central pixel in value is, the greater the value of the coefficient $\alpha'_k$ for the peripheral pixel becomes.

In step S1160, the reference interpolation circuit 1501 calculates a sum $\Sigma \alpha'$ of the coefficients $\alpha'_k$ in accordance with Expression 5 below.

$$\Sigma \alpha' = \alpha'_1 + \alpha'_2 + \alpha'_3 + \alpha'_4 + \alpha'_5 + \alpha'_6 + \alpha'_7 + \alpha'_8 \quad (5)$$

If $\Sigma \alpha'$ in Expression 5 is zero, division by zero will occur in demosaicing of G pixels, which will be described later, and thus in step S1170, the reference interpolation circuit 1501 checks whether or not the sum $\Sigma \alpha'$ obtained in step S1160 is zero.

If $\Sigma \alpha'$ is zero, all the eight pixels, namely, G' (UL), G' (U), G' (UR), G' (L), G' (R), G' (LL), G' (B) and G' (LR) have the same value, and $\alpha'_k = th - |\alpha_k|$ in Expression 4 will be zero for all the values of $\alpha'_k$. Therefore, if $\Sigma \alpha'$ is zero, an optimum value of $\alpha'$ is uniquely determined, and in step S1180, the reference interpolation circuit 1501 determines the value of $\alpha'$ as indicated by Expression 6 below.

$$\alpha'_1 = 1, \alpha'_2 = 1, \alpha'_3 = 1, \alpha'_4 = 1, \alpha'_5 = 1, \alpha'_6 = 1, \alpha'_7 = 1, \alpha'_8 = 1 \quad (6)$$

$$\sum \alpha' = 8$$

Figure 12:
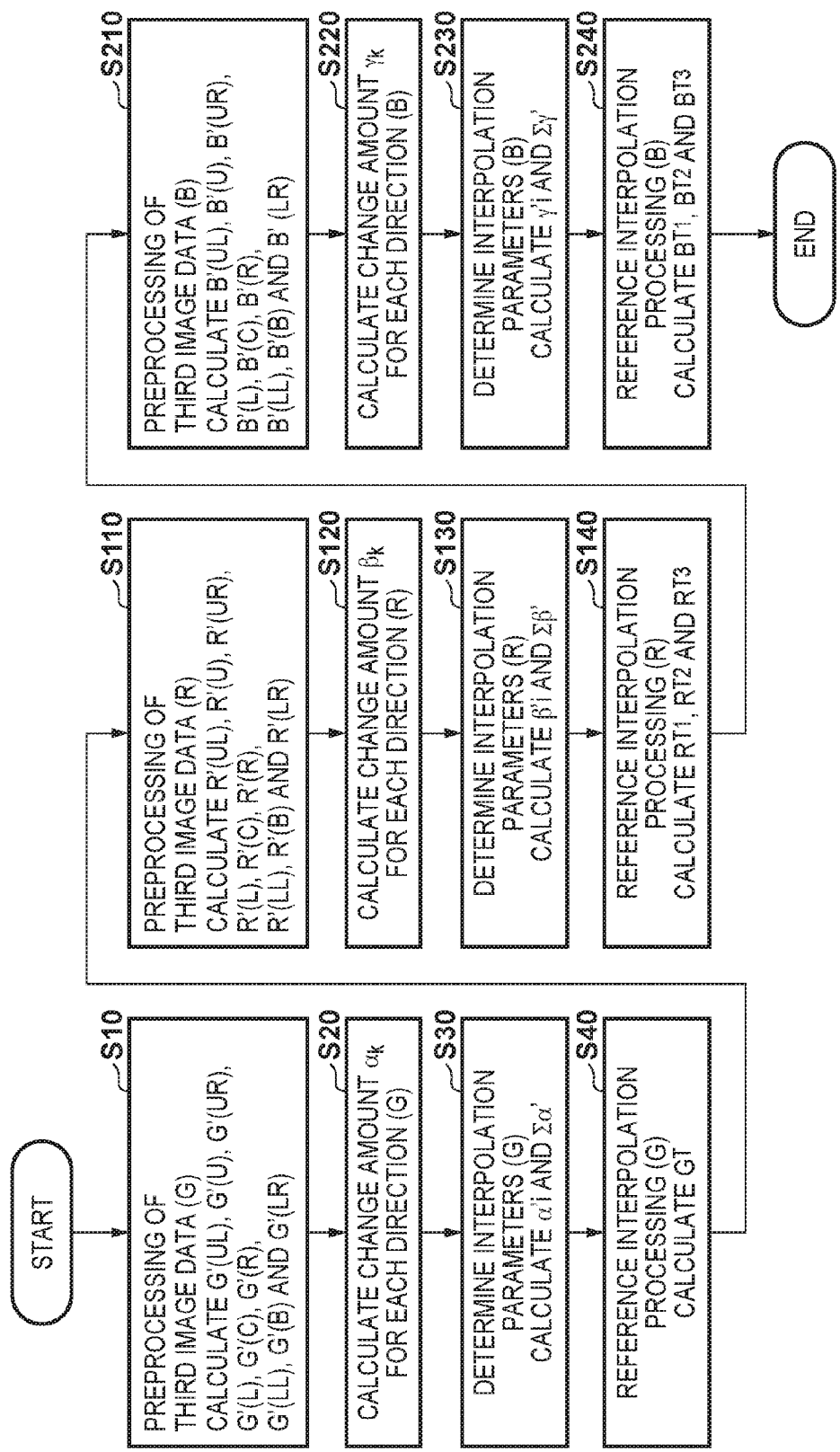
FIG. 12 is a flowchart of reference interpolation processing in the embodiments.

Such a series of processing is the processing of step S30 in FIG. 12, where the interpolation parameter $\alpha'_k$ and the sum $\Sigma \alpha'$ to be used in step S40 are obtained.

In step S40, the reference interpolation circuit 1501 calculates the G pixel $G^T$ to be interpolated, in accordance with Expression 7 below using the parameters obtained in step S30.

$$G^T = \tag{7}$$

$$\left\{ G(i_1, j_1-1) \times \left(\frac{\alpha'_1}{2} + \alpha'_2 + \frac{\alpha'_3}{2}\right) + G(i_1-1, j_1) \times \left(\frac{\alpha'_1}{2} + \alpha'_4 + \frac{\alpha'_6}{2}\right) + \right.$$

$$G(i_1, j_1+1) \times \left(\frac{\alpha'_6}{2} + \alpha'_7 + \frac{\alpha'_8}{2}\right) +$$

$$\left. G(i_1+1, j_1) \times \left(\frac{\alpha'_3}{2} + \alpha'_5 + \frac{\alpha'_8}{2}\right) \right\} / \Sigma\alpha'$$

Next, processing for R pixels will be described.

In step S110, the reference interpolation circuit 1501 assumes that the pixel in the third image data 1525 corresponding to the coordinates of the pixel to be interpolated in the first image data 1510 is the pixel R' (C), as shown in FIGS. 8A to 11B. The reference interpolation circuit 1501 then calculates the values of the pixel R' (C) and the pixels surrounding the pixel R' (C) in the eight directions in accordance with Expression 8 below.

$$R'(UL) = R'\left(i_2 - \frac{5}{4}, j_2 - \frac{5}{4}\right) \tag{8}$$

$$R'(U) = R'\left(i_2 - \frac{1}{4}, j_2 - \frac{5}{4}\right)$$

$$R'(UR) = R'\left(i_2 + \frac{3}{4}, j_2 - \frac{5}{4}\right)$$

$$R'(L) = R'\left(i_2 - \frac{5}{4}, j_2 - \frac{1}{4}\right)$$

$$R'(C) = R'\left(i_2 - \frac{1}{4}, j_2 - \frac{1}{4}\right)$$

$$R'(R) = R'\left(i_2 + \frac{3}{4}, j_2 - \frac{1}{4}\right)$$

$$R'(LL) = R'\left(i_2 - \frac{5}{4}, j_2 + \frac{3}{4}\right)$$

$$R'(B) = R'\left(i_2 - \frac{1}{4}, j_2 + \frac{3}{4}\right)$$

$$R'(LR) = R'\left(i_2 + \frac{3}{4}, j_2 + \frac{3}{4}\right)$$

In step S120, the reference interpolation circuit 1501 calculates, from the values of the nine pixels obtained in step S110, a correction parameter related to a correction amount used for demosaicing. The reference interpolation circuit 1501 calculates correction parameters $\beta_1$ to $\beta_8$ from the difference between the value of the pixel R' (C) and the value of each of the eight surrounding pixels in accordance with Expression 9 below.

$$\beta_1 = R'(UL) - R'(C)$$

$$\beta_2 = R'(U) - R'(C)$$

$$\beta_3 = R'(UR) - R'(C)$$

$$\beta_4 = R'(L) - R'(C)$$

$$\beta_5 = R'(R) - R'(C)$$

$$\beta_6 = R'(LL) - R'(C)$$

$$\beta_7 = R'(B) - R'(C)$$

$$\beta_8 = R'(LR) - R'(C) \tag{9}$$

In step S130, the reference interpolation circuit 1501 determines the similarity between the pixel R' (C) and the eight surrounding pixels based on the magnitude of the correction parameter $\beta_k$ (k=1 to 8) calculated in step S120, similarly to the processing of G pixels (step S30), and calculates the value of $\beta'_k$. The processing of step S130 will be described with reference to FIG. 13 again.

In step S1020, the reference interpolation circuit 1501 branches the processing in accordance with the color of the pixel to be interpolated. Here, the pixel to be interpolated is an R pixel, and thus the reference interpolation circuit 1501 advances the procedure to step S1210.

In step S1210, the reference interpolation circuit 1501 calculates a threshold value th used for calculating $\beta'_k$ in accordance with Expression 10 below, and advances the procedure to step S1220.

$$th = \frac{|\beta_1| + |\beta_2| + |\beta_3| + |\beta_4| + |\beta_5| + |\beta_6| + |\beta_7| + |\beta_8|}{8} \tag{10}$$

Subsequently, in the processing of steps S1220 to S1250, the reference interpolation circuit 1501 calculates $\beta'_k$ for all the values of $\beta_k$ by the operation of Expression 11 below that is based on the threshold value th.

$$\beta'_k = \begin{cases} th - |\beta_k| & (\text{if } |\beta_k| > th) \\ 0 & (\text{if } |\beta_k| \leq th) \end{cases} \tag{11}$$

The value of a peripheral pixel that satisfies $|\beta_k|>th$ has a low similarity to the value of the central pixel that is to be interpolated. Therefore, the coefficient $\beta'_k$ used for interpolation is set to zero, such that the pixel is excluded from interpolation processing.

Regarding a peripheral pixel that does not satisfy $|\beta_k|>th$, the coefficient $\beta'_k$ is set to $th-|\beta_k|$. Accordingly, the higher the similarity of the peripheral pixel to the central pixel in value is, the greater the value of the coefficient $\beta'_k$ for the peripheral pixel becomes.

In step S1260, the reference interpolation circuit 1501 calculates a sum $\Sigma\beta'$ of the coefficients $\beta'_k$ in accordance with Expression 12 below.

$$\Sigma\beta' = \beta'_1 + \beta'_2 + \beta'_3 + \beta'_4 + \beta'_5 + \beta'_6 + \beta'_7 + \beta'_8 \tag{12}$$

If $\Sigma\beta'$ in Expression 12 is zero, division by zero will occur in demosaicing of R pixels, which will be described later, and thus in step S1270, the reference interpolation circuit 1501 checks whether or not the sum $\Sigma\beta'$ obtained in step S1260 is zero.

If $\Sigma\beta'$ is zero, all the eight pixels, namely, R' (UL), R' (U), R' (UR), R' (L), R' (R), R' (LL), R' (B) and R' (LR) have the same value, and $\beta'_k = th - |\beta_k|$ in Expression 11 will be zero for all the values of $\beta'_k$. Therefore, if $\Sigma\beta'$ is zero, an optimum value of $\beta'$ is determined uniquely, and in step S1280, the reference interpolation circuit 1501 determines the value of $\beta'$ as indicated by Expression 13 below.

$$\beta'_1 = 1, \beta'_2 = 1, \beta'_3 = 1, \beta'_4 = 1, \beta'_5 = 1, \beta'_6 = 1, \beta'_7 = 1, \beta'_8 = 1 \tag{13}$$

$$\Sigma\beta' = 8$$

Such a series of processing is the processing of step S130 in FIG. 12, where interpolation parameters $\beta'_k$ and $\Sigma\beta'$ to be used in step S140 are obtained.

In step S140, the reference interpolation circuit 1501 calculates the R pixel $R^T$ to be interpolated in accordance with Expression 14 below using the parameters obtained in step S130.

$$R^{T1} = \left\{ R(i_1-1, j_1-1) \times \left( \beta'_1 + \frac{\beta'_2}{2} + \frac{\beta'_4}{2} \right) + \right.$$
$$R(i_1+1, j_1-1) \times \left( \frac{\beta'_2}{2} + \beta'_3 + \frac{\beta'_5}{2} \right) + R(i_1-1, j_1+1) \times$$
$$\left. \left( \frac{\beta'_4}{2} + \beta'_6 + \frac{\beta'_7}{2} \right) + R(i_1+1, j_1+1) \times \left( \frac{\beta'_5}{2} + \frac{\beta'_7}{2} + \beta'_8 \right) \right\} \bigg/ \Sigma \beta' \quad (14)$$

After calculating all the pixels $R^{T1}$ to be interpolated, the reference interpolation circuit 1501 calculates the pixels $R^{T2}$ and $R^{T3}$ to be interpolated in accordance with Expressions 15 and 16 below.

$$R^{T2} = \left\{ R^{*U}(i_1, j_1-1) \times \left( \frac{\beta'_1}{2} + \beta'_2 + \frac{\beta'_3}{2} \right) + \right.$$
$$R(i_1-1, j_1) \times \left( \frac{\beta'_1}{2} + \beta'_4 + \frac{\beta'_6}{2} \right) + R^{*B}(i_1, j_1+1) \times$$
$$\left. \left( \frac{\beta'_6}{2} + \beta'_7 + \frac{\beta'_8}{2} \right) + R(i_1+1, j_1) \times \left( \frac{\beta'_3}{2} + \beta'_5 + \frac{\beta'_8}{2} \right) \right\} \bigg/ \Sigma \beta' \quad (15)$$

$$R^{T3} = \left\{ R(i_1, j_1-1) \times \left( \frac{\beta'_1}{2} + \beta'_2 + \frac{\beta'_3}{2} \right) + \right.$$
$$R^{*L}(i_1-1, j_1) \times \left( \frac{\beta'_1}{2} + \beta'_4 + \frac{\beta'_6}{2} \right) + R(i_1, j_1+1) \times$$
$$\left. \left( \frac{\beta'_6}{2} + \beta'_7 + \frac{\beta'_8}{2} \right) + R^{*R}(i_1+1, j_1) \times \left( \frac{\beta'_3}{2} + \beta'_5 + \frac{\beta'_8}{2} \right) \right\} \bigg/ \Sigma \beta' \quad (16)$$

Here, $R^{*U}(i_1, j_1-1)$, $R^{*B}(i_1, j_1+1)$, $R^{*L}(i_1-1, j_1)$ and $R^{*R}(i_1+1, j_1)$ are calculated as $R^{T1}$.

Lastly, processing of B pixels will be described.

In step S210, the reference interpolation circuit 1501 assumes that the pixel in the third image data 1525 corresponding to the coordinates of a pixel to be interpolated in the first image data 1510 is the pixel B' (C), as shown in FIGS. 8A and 11B. The reference interpolation circuit 1501 then calculates the values of the pixel B' (C) and the pixels surrounding the pixel B' (C) in the eight directions in accordance with Expression 17 below.

$$B'(UL) = B'\left(i_2 - \frac{3}{4}, j_2 - \frac{3}{4}\right) \quad (17)$$
$$B'(U) = B'\left(i_2 + \frac{1}{4}, j_2 - \frac{3}{4}\right)$$
$$B'(UR) = B'\left(i_2 + \frac{5}{4}, j_2 - \frac{3}{4}\right)$$
$$B'(L) = B'\left(i_2 - \frac{3}{4}, j_2 + \frac{1}{4}\right)$$
$$B'(C) = B'\left(i_2 + \frac{1}{4}, j_2 + \frac{1}{4}\right)$$
$$B'(R) = B'\left(i_2 + \frac{5}{4}, j_2 + \frac{1}{4}\right)$$
$$B'(LL) = B'\left(i_2 - \frac{3}{4}, j_2 + \frac{5}{4}\right)$$
$$B'(B) = B'\left(i_2 + \frac{1}{4}, j_2 + \frac{5}{4}\right)$$
$$B'(LR) = B'\left(i_2 + \frac{5}{4}, j_2 + \frac{5}{4}\right)$$

In step S220, the reference interpolation circuit 1501 calculates, from the values of the nine pixels obtained in step S210, a correction parameter related to a correction amount used for demosaicing. The reference interpolation circuit 1501 calculates correction parameters $\gamma_1$ to $\gamma_8$ from the difference between the value of the pixel B' (C) and the value of each of the eight surrounding pixels, in accordance with Expression 18 below.

$$\gamma_1 = B'(UL) - B'(C)$$
$$\gamma_2 = B'(U) - B'(C)$$
$$\gamma_3 = B'(UR) - B'(C)$$
$$\gamma_4 = B'(L) - B'(C)$$
$$\gamma_5 = B'(R) - B'(C)$$
$$\gamma_6 = B'(R) - B'(C)$$
$$\gamma_7 = B'(B) - B'(C)$$
$$\gamma_8 = B'(LR) - B'(C) \quad (18)$$

In step S230, the reference interpolation circuit 1501 determines the similarity between the pixel B' (C) and the eight surrounding pixels based on the magnitude of the correction parameter $\gamma_k$ (k=1 to 8) calculated in step S220, and calculates the value of $\gamma'_k$. The processing of step S230 will be described with reference to FIG. 13 again.

In step S1020, the reference interpolation circuit 1501 branches the processing in accordance with the color of the pixel to be corrected. Here, the pixel to be corrected is a B pixel, and thus the reference interpolation circuit 1501 advances the procedure to step S1310.

In step S1310, the reference interpolation circuit 1501 calculates a threshold value th used for calculating $\gamma'_k$ in accordance with Expression 19 below, and advances the procedure to step S1320.

$$th = \frac{|\gamma_1| + |\gamma_2| + |\gamma_3| + |\gamma_4| + |\gamma_5| + |\gamma_6| + |\gamma_7| + |\gamma_8|}{8} \quad (19)$$

Subsequently, in the processing of steps S1320 to S1350, the reference interpolation circuit 1501 calculates $\gamma'_k$ for all the values of $\gamma_k$ by the operation of Expression 20 below that is based on the threshold value th.

$$\gamma'_k = \begin{cases} th - |\gamma_k| & (\text{if } |\gamma_k| > th) \\ 0 & (\text{if } |\gamma_k| \leq th) \end{cases} \quad (20)$$

The value of a peripheral pixel that satisfies $|\gamma_k| > th$ has a low similarity to the value of the central pixel that is to be interpolated. Therefore, the coefficient $\gamma'_k$ used for interpolation is set to zero, such that the pixel is excluded from interpolation processing.

Regarding a peripheral pixel that does not satisfy $|\gamma_k| > th$, the coefficient $\gamma'_k$ is set to $th - |\gamma_k|$. Accordingly, the higher the similarity of the peripheral pixel to the central pixel in value is, the greater the value of the coefficient $\gamma'_k$ for the peripheral pixel becomes.

In step S1360, the reference interpolation circuit 1501 calculates a sum $\Sigma \gamma'$ of the coefficients $\gamma' k$ in accordance with Expression 21 below.

$$\Sigma \gamma' = \gamma'_1 + \gamma'_2 + \gamma'_3 + \gamma'_4 + \gamma'_5 + \gamma'_6 + \gamma'_7 + \gamma'_8 \quad (21)$$

If Σγ' in Expression 21 is zero, division by zero will occur in demosaicing of B pixels, which will be described later, and thus in step S1370, the reference interpolation circuit 1501 checks whether or not the sum Σγ' obtained in step S1360 is zero.

If Σγ' is zero, all the eight pixels, namely, the pixels B' (UL), B' (U), B' (UR), B' (L), B' (R), B' (LL), B' (B) and B' (LR) have the same value, and γ'$_k$=th−|γ$_k$| in Expression 11 will be zero for all the values of γ'$_k$. Therefore, if Σγ' is zero, an optimum value of γ' is determined uniquely, and in step S1380, the reference interpolation circuit 1501 determines the value of γ' as indicated by Expression 22 below.

$$\gamma'_1 = 1, \alpha'_2 = 1, \alpha'_3 = 1, \alpha'_4 = 1, \gamma'_5 = 1, \gamma'_6 = 1, \gamma'_7 = 1, \gamma'_8 = 1 \quad (22)$$
$$\Sigma\gamma' = 8$$

Such a series of processing is the processing of step S230 in FIG. 12, where interpolation parameters γ'$_k$ and Σγ' to be used in step S240 are obtained.

In step S240, the reference interpolation circuit 1501 calculates the B pixel $B^T$ to be interpolated, using the parameters obtained in step S230 in accordance with Expression 23 below.

$$B^{T1} = \left\{ B(i_1 - 1, j_1 - 1) \times \left( \gamma'_1 + \frac{\gamma'_2}{2} + \frac{\gamma'_4}{2} \right) + \right. \quad (23)$$
$$B(i_1 + 1, j_1 - 1) \times \left( \frac{\gamma'_2}{2} + \gamma'_3 + \frac{\gamma'_5}{2} \right) + B(i_1 - 1, j_1 + 1) \times$$
$$\left. \left( \frac{\gamma'_4}{2} + \gamma'_6 + \frac{\gamma'_7}{2} \right) + B(i_1 + 1, j_1 + 1) \times \left( \frac{\gamma'_5}{2} + \frac{\gamma'_7}{2} + \gamma'_8 \right) \right\} / \Sigma\gamma'$$

After calculating all the pixels $B^{T1}$ to be interpolated, the reference interpolation circuit 1501 calculates the pixels $B^{T2}$ and $B^{T3}$ to be interpolated in accordance with Expressions 24 and 25 below.

$$B^{T2} = \left\{ B^{*U}(i_1, j_1 - 1) \times \left( \frac{\gamma'_1}{2} + \gamma'_2 + \frac{\gamma'_3}{2} \right) + \right. \quad (24)$$
$$B(i_1 - 1, j_1) \times \left( \frac{\gamma'_1}{2} + \gamma'_4 + \frac{\gamma'_6}{2} \right) + B^{*B}(i_1, j_1 + 1) \times$$
$$\left. \left( \frac{\gamma'_6}{2} + \gamma'_7 + \frac{\gamma'_8}{2} \right) + B(i_1 + 1, j_1) \times \left( \frac{\gamma'_3}{2} + \gamma'_5 + \frac{\gamma'_8}{2} \right) \right\} / \Sigma\gamma'$$

$$B^{T3} = \left\{ B(i_1, j_1 - 1) \times \left( \frac{\gamma'_1}{2} + \gamma'_2 + \frac{\gamma'_3}{2} \right) + \right. \quad (25)$$
$$B^{*L}(i_1 - 1, j_1) \times \left( \frac{\gamma'_1}{2} + \gamma'_4 + \frac{\gamma'_6}{2} \right) + B(i_1, j_1 + 1) \times$$
$$\left. \left( \frac{\gamma'_6}{2} + \gamma'_7 + \frac{\gamma'_8}{2} \right) + B^{*R}(i_1 + 1, j_1) \times \left( \frac{\gamma'_3}{2} + \gamma'_5 + \frac{\gamma'_8}{2} \right) \right\} / \Sigma\gamma'$$

Here, $B^{*U}(i_1, j_1-1)$, $B^{*B}(i_1, j_1+1)$, $B^{*L}(i_1-1, j_1)$ and $B^{*R}(i_1+1, j_1)$ are calculated as $B^{T1}$.

The reference interpolation circuit 1501 performs the processing of steps S10 to S240 on all the pixels to be interpolated. Accordingly, demosaicing for obtaining a full-color image in which there are RGB components at all the pixel positions is complete.

Note that in this embodiment, a description was given for processing of the reference interpolation circuit 1501 in the case where the third image data 1525 having a resolution twice the resolution of the first image data 1510 in each of the horizontal direction and the vertical direction is generated by the resolution conversion circuit 1503. However, the resolutions in the horizontal and vertical directions of the third image data 1525 may be the n-th power of 2 of the resolutions of the first image data (n is an integer larger than or equal to 2).

Even if the resolutions in the horizontal and vertical directions of the third image data 1525 are four times, eight times or the like, it suffices to change the pixels and weighting used for calculating surrounding pixels in steps S10, S110 and S210.

Similarly, regarding demosaicing and a demosaicing parameter as well, adaptive interpolation that takes pixels in the eight directions into consideration has been illustrated, but in the case where the resolution of third image data is higher, it is possible to improve the interpolation accuracy by performing interpolation that takes pixels in more directions into consideration.

Note that in the case where the resolution of second image data is the n-th power of 2 of the resolution of the first image data 1510 (n is an integer greater than or equal to 2) in each of the horizontal direction and the vertical direction, the second image data can be used for reference interpolation without being converted into third image data.

In addition, although the above description is based on the presumption that the fields of view of the first and second image data are designed to match each other, it is sufficient that the fields of view of the first image data and the second image data overlap at least partially. Also, a configuration may be adopted in which demosaicing by reference interpolation is performed on an area in which the fields of view overlap, and conventional demosaicing is performed on an area in which the fields of view do not overlap. Moreover, in the case of capturing a subject that does not substantially change over time, first image data and second image data do not necessarily need to be captured concurrently.

Moreover, the number of image sensors is not limited to two, and three or more image sensors that have different pixel pitches may be used. In this case, out of image data obtained with any two image sensors, image data obtained with an image sensor having a narrower pixel pitch can be used for demosaicing of image data obtained with an image sensor having a wider pixel pitch.

According to this embodiment, out of image data obtained with a plurality of image sensors having different pixel pitches, image data obtained with an image sensor having a second pixel pitch that is narrower than a first pixel pitch is used for demosaicing of image data obtained with an image sensor having the first pixel pitch. Therefore, the interpolation accuracy of an edge portion in which a high spatial frequency is high improves, and it is possible to obtain a full-color image having a high sense of resolution and a high image quality in which the occurrence of color moiré and a pseudo color are suppressed.

Moreover, in the case where the area dimension of the light receiving areas (photodiode) of a pixel of the image sensor having the first pixel pitch is made greater than the area dimension of the light receiving area of a pixel of the image sensor having the second pixel pitch, it is possible to realize an improvement in S/N ratio and dynamic range, in addition to the improvement in the sense of resolution due to demosaicing. For example, the present invention is useful particularly in the case where the exposure time is limited by the frame rate, such as in the case of moving image capturing.

Furthermore, even in the case where the processing time is limited by the frame rate, such as in the case of moving image capturing, real-time processing can be realized by selecting an operation mode of A/D conversion that is based on the resolution of the image data.

Second Embodiment

Next, a second embodiment of the present invention will be described. In this embodiment, a description will be given for demosaicing for pieces of image data that have different resolutions and are obtained by two image sensors having the same physical pixel pitch and different reading pixel pitches.

Specifically, letting the pixel pitches of a first image sensor 1100' in the second embodiment be $\Delta x_1$ and $\Delta y_1$, and the pixel pitches of a second image sensor 1200 be $\Delta x_2$ and $\Delta y_2$, then $\Delta x_1 = \Delta x_2$, $\Delta y_1 = \Delta y_2$, $\Delta x_1 = \Delta y_1$, and $\Delta x_2 = \Delta y_2$ hold in this embodiment.

Also, first and second image data having different resolutions are read out assuming that reading pixel pitches $\Delta x'_1$ and $\Delta y'_1$ of the first image sensor 1100' satisfy $\Delta x'_1 > \Delta x_1$ and $\Delta y'_1 > \Delta y_1$, and reading pixel pitches $\Delta x'_2$ and $\Delta y'_2$ of the second image sensor 1200 satisfy $\Delta x'_2 = \Delta x_2$ and $\Delta y'_2 = \Delta y_2$.

Figure 14:
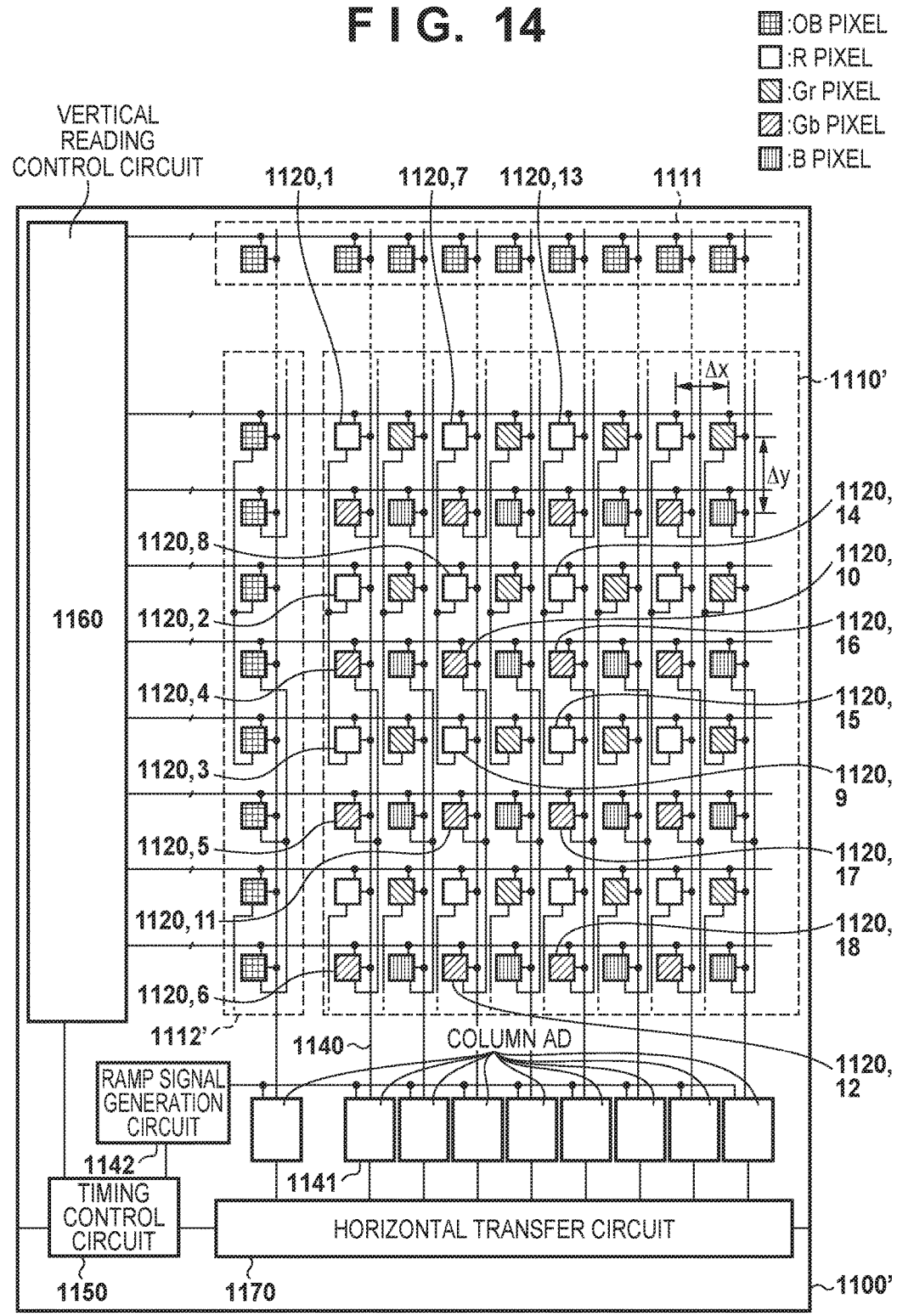
FIG. 14 is a diagram showing a configuration example of an image sensor in the second embodiment.

FIG. 14 is a schematic diagram showing a configuration example of the first image sensor 1100' in the second embodiment, and the same reference numerals are given to constituent elements similar to those in the first embodiment (FIG. 2). In this embodiment, addition lines are provided for pixels 1120 arranged in a predetermined manner.

For example, an addition line connecting a pixel 1120 (1), a pixel 1120 (2) and a pixel 1120 (3) is provided, and similarly, an addition line connecting a pixel 1120 (4), a pixel 1120 (5) and a pixel 1120 (6) is provided. Also, an addition line for OB pixels is provided in a vertical OB pixel portion 1112'. The arrangement of pixels connected (pixels to be added) by an addition line is determined is at the time of designing.

Figure 3B:
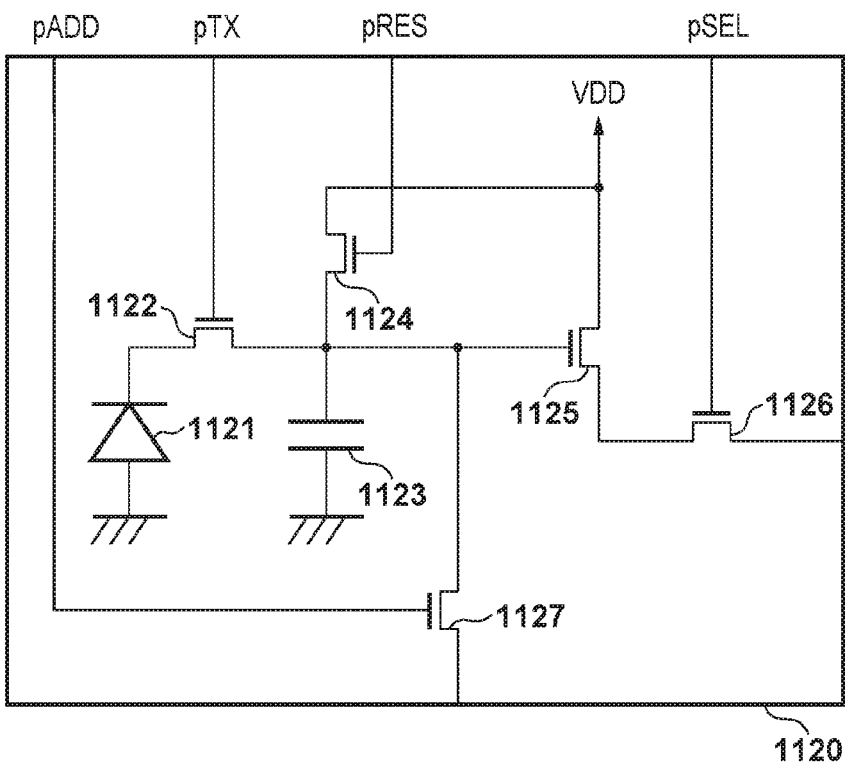

Moreover, FIG. 3B is a circuit diagram of the pixels 1120 in the second embodiment, and the same reference numerals are given to constituent elements similar to those in the first embodiment (FIG. 3A). In this embodiment, an addition Tr 1127 is added, which connects an addition line to a point between an FD 1123 and a pixel amplifier 1125, and is on-off controlled by an addition signal pADD. Therefore, the addition signal pADD enables the control of connection and disconnection between the addition line and the FD 1123. For example, the addition signal pADD is output by a vertical reading control circuit 1160 in accordance with control by a timing control circuit 1150.

Operations of pixels in the second embodiment are controlled as follows. First, the addition signal pADD is asserted, and the FD 1123 is connected to the addition line. In the case of this embodiment, for example, the pixel 1120 (1), the pixel 1120 (2) and the pixel 1120 (3) are added, and the pixel 1120 (4), the pixel 1120 (5) and the pixel 1120 (6) are added. Control by the addition signal pADD can be performed using the same control signal for all the pixels.

Next, a control signal pTX and an FD reset signal pRES are asserted, and a photodiode 1121 and the FD 1123 are reset. Negating the control signal pTX after the reset is complete starts an accumulation period, and the photodiode 1121 accumulates electric charge (light signal) generated by light that enters during the accumulation period.

When the predetermined accumulation period has elapsed, a reset voltage amplified by the pixel amplifier 1125 is input to a column AD converter 1141 via a vertical transfer line 1140 and is converted into a digital signal by negating the FD reset signal pRES and asserting the row selection signal pSEL. This signal is referred to as an N signal. The N signal is saved in a horizontal transfer circuit 1170.

Next, the control signal pTX is asserted, and the electric charge accumulated in the photodiode 1121 is transferred to the FD 1123 and converted into a voltage. The voltage of the FD 1123 is amplified by the pixel amplifier 1125, is then input to the column AD converter 1141 via the vertical transfer line 1140, and is converted into a digital signal. This signal is referred to as an S signal. The S signal is a digital signal that is based on the electric charge accumulated in the photodiode 1121. The influence of noise can be suppressed by subtracting the N signal from the S signal in the horizontal transfer circuit 1170.

Performing reading with addition as described above makes it possible to add pixel signals in the vertical direction, which increases the apparent area dimension of the photodiodes, and therefore to improve the dynamic range and the SN properties of the signals.

The column AD converter 1141 has a structure similar to that in the first embodiment, and can select operations in the AD high-resolution mode or operations in the AD high-speed mode in accordance with control using a ramp signal.

Note that an addition line for connecting a plurality of pixels may be provided in the horizontal direction as well, but an increase in the number of addition lines reduces the size of the openings of the pixels, reduces the effective areas of the photodiodes, and deteriorates the dynamic range and the SN properties of the signals. Therefore, in this embodiment, instead of providing addition lines for adding pixels in the horizontal direction, the horizontal transfer circuit 1170 performs addition averaging, thereby achieving the same effect as that of addition lines.

An example of addition processing in the horizontal direction will be described.

A digital value acquired by adding the pixel 1120 (1), the pixel 1120 (2) and the pixel 1120 (3) by connecting the FDs 1123 by the above-described method and converting the addition result by the column AD converter 1141 is stored in the horizontal transfer circuit 1170. At this time, similarly, a digital value acquired by adding a pixel 1120 (7), a pixel 1120 (8) and a pixel 1120 (9), and a digital value acquired by adding a pixel 1120 (13), a pixel 1120 (14) and a pixel 1120 (15) are stored in the horizontal transfer circuit 1170.

After that, the average value of the nine pixels can be finally obtained by further adding these three digital values using an adder and dividing the added value by nine using a divider or a bit shift calculator.

Also, the combination of pixels to be added can be made selectable from a plurality of options by changing the method for controlling pADD and the settings of addition processing in the horizontal direction. The more the number of pixels to be added increases, the more the number of pixels to be read out decreases, and thus the time required for reading the image data is shortened. In the following description, the above-described readout by addition control is referred to as "reading with addition".

Also, in the configuration of this embodiment as well, reading similar to that of the first embodiment is enabled by not performing the initial asserting of pADD, and not performing addition processing in the horizontal transfer circuit in the horizontal direction. Hereinafter, readout controlled similarly to the first embodiment is referred to as "reading without addition" in order to be distinguished from reading with addition.

Examples of reading without addition and reading with addition have been described as control operations for reading signals from pixels, but reading may be performed by other control operations.

The first image sensor 1100' and the second image sensor 1200 can be driven in accordance with an intended purpose by the combination of the settings of reading with addition and reading without addition and the setting of the AD high-resolution mode and the AD high-speed mode.

For example, consider a case of concurrently performing moving image capturing with the first image sensor 1100' and the second image sensor 1200, and performing demosaicing using reference interpolation on each frame similarly to the first embodiment. In this case, the first image sensor 1100' is driven for "reading with addition" and in the "AD high-resolution mode" such that a moving image having sufficient tone properties can be captured at an appropriate frame rate. Also, the second image sensor 1200 is driven for "reading without addition" and in the "AD high-speed mode", in order to read out, at a frame rate similar to that of the first image sensor 1100', a frame having a greater number of pixels than the first image sensor.

Figure 15:
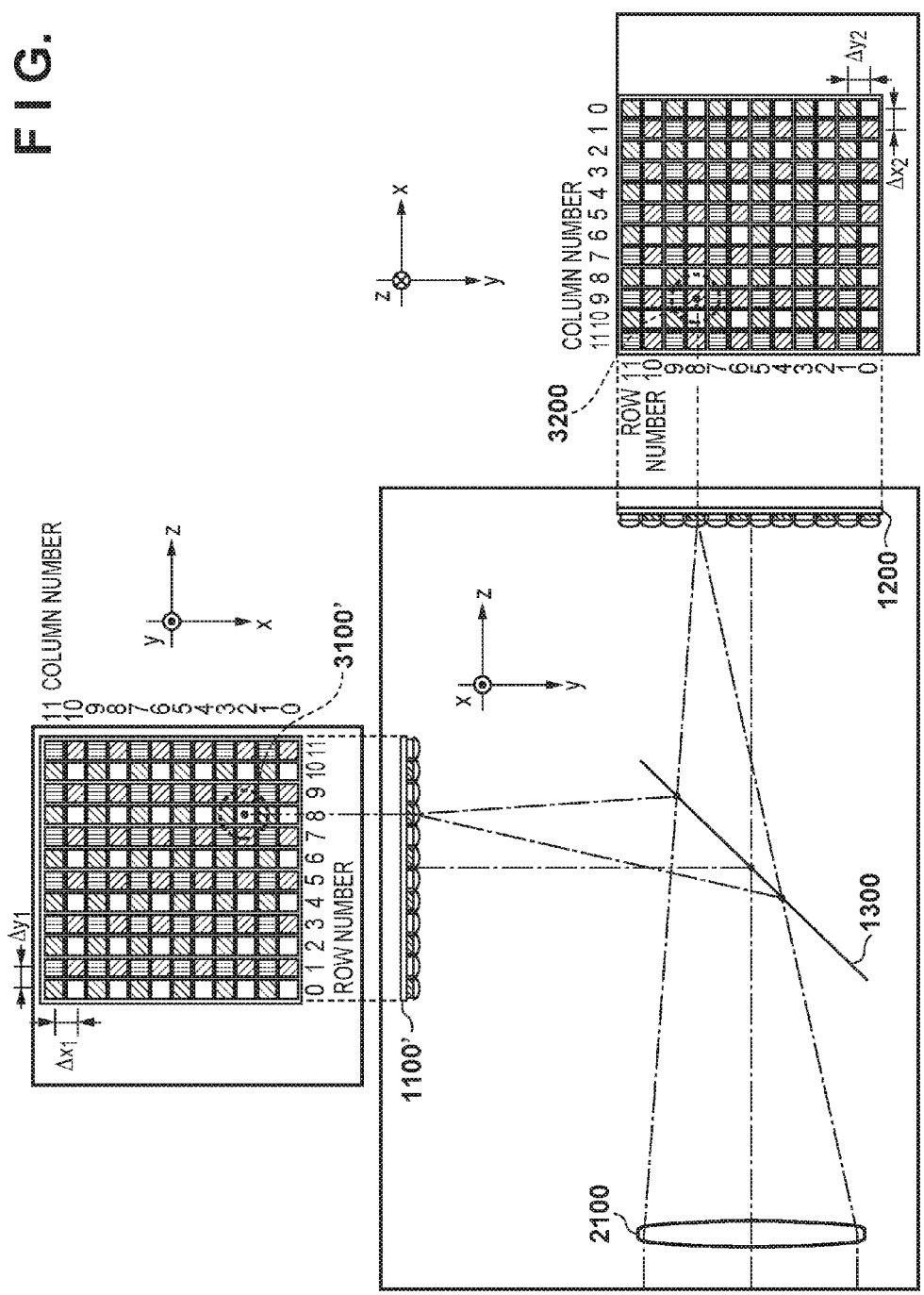
FIG. 15 is a diagram related to image projection in the second embodiment.

FIG. 15 is a diagram schematically showing a state in which a point image formed by a condenser lens 2100 is projected on the image capturing planes of the first image sensor 1100' and the second image sensor 1200, in this embodiment. The same reference numerals are given to constituent elements similar to those in the first embodiment (FIG. 5). Dotted lines in FIG. 15 schematically indicate a luminous beam. A luminous beam that passes through the condenser lens 2100 is divided by a half mirror 1300 into two optical paths. Also, the point image formed by the condenser lens 2100 is projected both on the first image sensor 1100' as a point image 3100' centered on an effective pixel (2, 8) and on the second image sensor 1200 as a point image 3200 centered on an effective pixel (9, 8). Here, the coordinates of a pixel are expressed as (a column number, a row number).

The radii of the point images that are being projected are the same, but the first image sensor 1100' performs reading with addition, and thus in the first image data 1510, the image is reduced to $\Delta x_1/\Delta x'_1$ in the horizontal direction. The same applies to the vertical direction.

In the first embodiment, the first image data 1510 whose resolution is lower than the second image data 1520 is obtained by changing the physical pixel pitch of the image sensor. In this embodiment, first image data 1510 and second image data 1520 similar to those of the first embodiment are obtained by changing the reading pixel pitch of the image sensor.

Therefore, the signal processing circuit 1500 executes processing similar to that of the first embodiment on the first image data 1510 and the second image data 1520, and thereby the full-color image 1530 can be obtained.

According to this embodiment, even in the case of using a plurality of image sensors having the same physical pixel pitch, an effect similar to that of the first embodiment can be obtained.

Note that the format of first image data is not limited to those described in the first and second embodiments, and various types of image data having different resolutions, aspect ratios and the like can be acquired in accordance with the combination of the physical pixel pitch and the reading pixel pitch.

Third Embodiment

Figure 16:
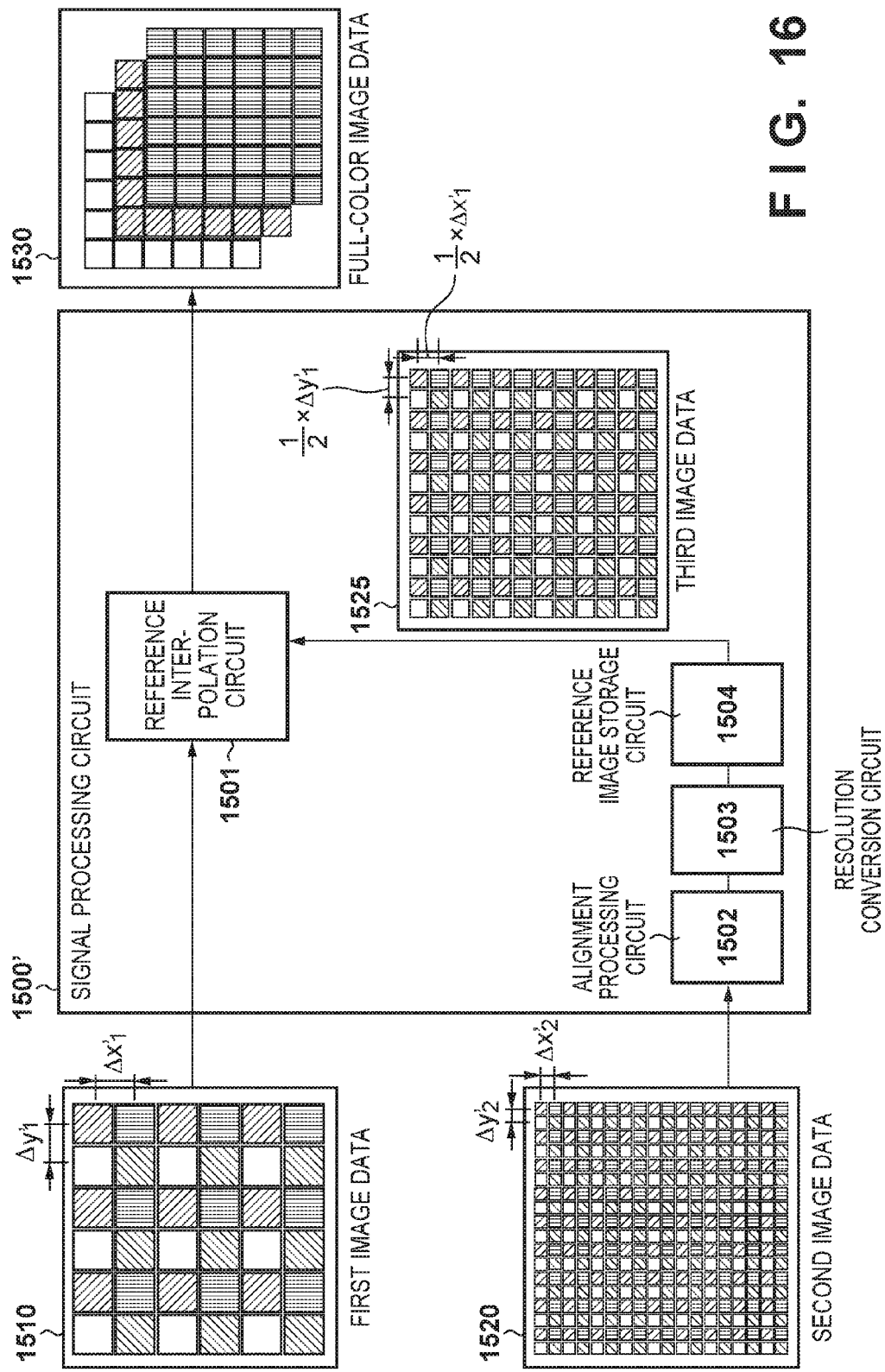
FIG. 16 is a block diagram showing an example of a functional configuration of a signal processing circuit according to a third embodiment.

Next, a third embodiment of the present invention will be described. This embodiment may be the same as the first and second embodiments except for the configuration of the signal processing circuit, and thus the signal processing circuit will be described. FIG. 16 is a diagram schematically showing an overview of data processing in this embodiment along with an example of the functional configuration of a signal processing circuit 1500'. In FIG. 16, the same reference numerals are given to the constituent elements that are common with the first embodiment (FIG. 7). Note that illustration is presented assuming that a first image sensor 1100 having the same configuration as the first embodiment is used, but a first image sensor 1100 having the same configuration as the second embodiment may be used. In the signal processing circuit 1500' in this embodiment, a reference image storage circuit 1504 is provided at a stage after a resolution conversion circuit 1503.

Similarly to the first and second embodiments, second image data 1520 is processed by an alignment processing circuit 1502 and a resolution conversion circuit 1503 and aligned with first image data 1510, and the resolution of the second image data 1520 is converted, so as to generate third image data 1525. The third image data 1525 is then stored in the reference image storage circuit 1504. Note that in the case where the resolution does not need to be converted, the second image data 1520 is stored as the third image data 1525 without any change.

In this embodiment, the reference interpolation circuit 1501 performs demosaicing using the first image data 1510 and the third image data 1525 that is stored in the reference image storage circuit 1504, similarly to the first or second embodiment.

Whether or not the third image data 1525 stored in the reference image storage circuit 1504 can be used in reference interpolation processing is determined, for example, based on the difference between the time when the first image data 1510 was obtained and the time when the second image data 1520 on which the third image data 1525 is based was obtained. However, for example, an acceptable time difference can depend on the magnitude of the movement of the subject. For example, the smaller the movement of the subject is, the longer the acceptable time difference becomes. Moreover, portions that can and cannot be used in reference interpolation processing can be present in the third image data 1525.

Operation control of obtaining image data and demosaicing in this embodiment will be described below with reference to FIG. 17. The upper part in FIG. 17 shows operations of controlling reading of the first image sensor 1100 and the timing thereof.

When a frame synchronization signal is input to the first image sensor 1100, signals are read out in order from the leading pixel row of an effective pixel portion 1110 as indicated by a straight line of an Nth frame reading signal. Also, the accumulation period for each pixel row starts at a timing of an Nth frame reset signal indicated by a dotted line, and the difference between the reset signal and the readout time is the accumulation period for each pixel row.

The lower part in FIG. 17 shows operations of controlling reading of the second image sensor 1200 and the timing thereof. In this embodiment, reading of the first image sensor 1100 and reading of the second image sensor 1200 are not synchronized, and the reading of the second image sensor 1200 starts in synchronization with a frame synchronization signal for the second image sensor 1200 independent from the frame synchronization signal supplied to the first image sensor 1100.

The second image sensor 1200 is read out after a capturing request signal of the second image sensor 1200 is asserted. By negating the capturing request signal of the second image sensor 1200, a camera control circuit 1400 can stop reference interpolation processing and capturing with the second image sensor 1200. For example, when a setting that is not suitable as a capturing condition for an image used for reference interpolation is made, such as a case where a capturing sensitivity that is larger than or equal to a predetermined value is set, the camera control circuit 1400 can, for example, negate the capturing request signal, but other conditions may also be used. In the example in FIG. 17, assertion of the capturing request signal is held, and thus capturing with the second image sensor 1200 and reference interpolation processing in the signal processing circuit 1500' are continuously performed.

For demosaicing of image data of an Nth frame of the first image sensor 1100, the signal processing circuit 1500' uses third image data generated based on image data of an M-th frame captured with the second image sensor 1200 and stored in the reference image storage circuit 1504. Note that in FIG. 17, timings of obtaining the second image data and the first image data are focused on, and thus for the sake of convenience, a case is described in which the second image data is used as the third image data without any change.

For demosaicing of image data of an N+1 frame of the first image sensor 1100 as well, the signal processing circuit 1500' uses the image data of the M-th frame of the second image sensor 1200 stored in the reference image storage circuit 1504.

Figure 18:
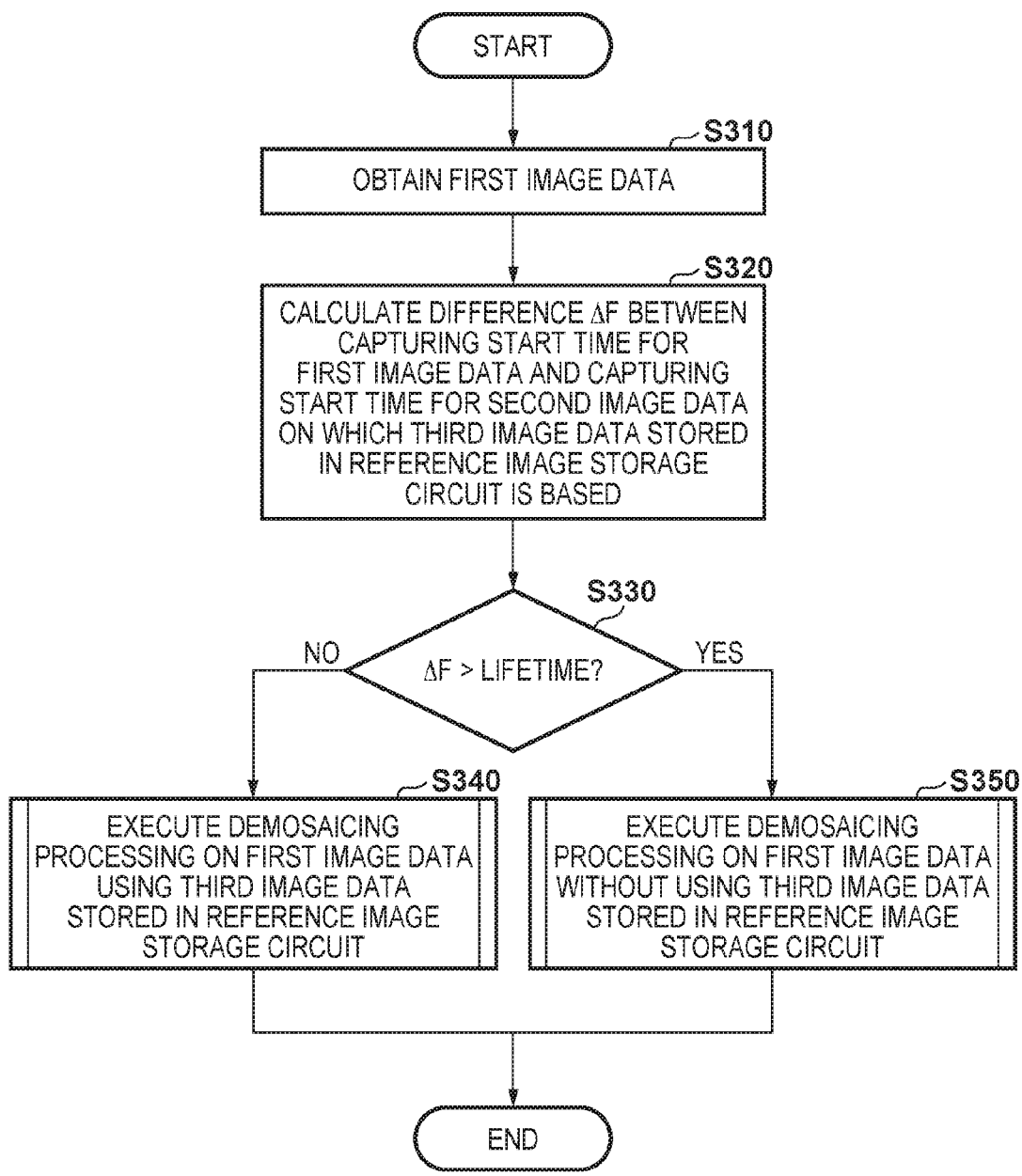
FIG. 18 is a flowchart related to operations of the signal processing circuit in the third embodiment.

However, referring to old image data can cause deterioration of the interpolation accuracy, and thus the signal processing circuit 1500' of this embodiment performs control shown in FIG. 18.

In step S310, the signal processing circuit 1500' obtains the first image data from the first image sensor 1100.

Subsequently, in step S320, the signal processing circuit 1500' determines whether or not a difference ΔF in capturing start time between the first image data and the second image data, on which the third image data stored in the reference image storage circuit 1504 is based, is greater than a predetermined value (lifetime). If it is not determined that ΔF is greater than the predetermined value, the signal processing circuit 1500' advances the procedure to step S340, and executes demosaicing using the third image data stored in the reference image storage circuit 1504.

On the other hand, if it is determined that ΔF is greater than the predetermined value, the signal processing circuit 1500' advances the procedure to step S350, and executes demosaicing without using the third image data stored in the reference image storage circuit 1504.

For example, in the case where the difference ΔF (N) in capturing start time between an M-th frame of the second image sensor 1200 and an Nth frame of the first image sensor is greater than the predetermined value, the signal processing circuit 1500' does not use, for demosaicing, the third image data that is based on the M-th frame of the second image sensor 1200.

Subsequently, when executing demosaicing in step S340, the reference interpolation circuit 1501 uses, for reference, an area in which the difference between corresponding pixel values in the first image data 1510 and the third image data that is stored in the reference image storage circuit 1504 is less than or equal to a predetermined value. For example, the reference interpolation circuit 1501 obtains the difference in value between each of a plurality of pixels in the first image data that are positioned in the periphery of a virtual pixel to be interpolated and exist in actuality and a pixel in the third image data that has the same color and is present at a position corresponding to or closest to that pixel of the first image data. If the total of the differences is less than or equal to a predetermined value, the reference interpolation circuit 1501 executes demosaicing using the above-described reference interpolation, and if the total of the differences exceeds the predetermined value, executes demosaicing in which reference interpolation is not used for the virtual pixel to be interpolated.

Even in a case where there is a difference in capturing time between the first image data 1510 and the second image data 1520, the above-described operations enable demosaicing using reference interpolation at least partially.

According to this embodiment, image data to be referred to and used during reference interpolation is stored, and thus restriction on timings of capturing with the first and second image sensors is alleviated. Therefore, it becomes possible to implement reference interpolation for image data acquired with more diversified image capture apparatuses.

Some exemplary embodiments of the present invention have been described above by way of example only, and should not be interpreted to limit the scope of the present invention in any sense. The scope of the present invention is specified by the scope of the claims, and variations and equivalents encompassed by the scope of the claims are included in the scope of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-249036, filed on Dec. 21, 2015, which is hereby incorporated by reference herein in its entirety.

What is claimed is:

1. An image processing apparatus comprising:
 a signal processing circuit that obtains first image data and second image data, and executes demosaicing on the first image data by referring to the second image data, wherein a field of view of the second image data overlaps a field of view of the first image data, and resolution of the second image data is higher than that of the first image data, wherein:

each pixel value in the first image data corresponds to one color component out of a plurality of color components that constitute a color filter of an image sensor used for obtaining the first image data, each pixel value in the second image data corresponds to one color component out of a plurality of color components that constitute a color filter of an image sensor used for obtaining the second image data, and the signal processing circuit executes demosaicing on the pixel to be interpolated by referring to, out of values of pixels that constitute the second image data, a value of a pixel (i) at a first position corresponding to a position of a pixel to be interpolated in the first image data or pixel (ii) at a second position being closest to the first position.

2. The image processing apparatus according to claim 1, wherein
the resolution of the second image data is an n-th power of 2 of the resolution of the first image data where n is an integer.

3. The image processing apparatus according to claim 1, wherein
the signal processing circuit generates, from the second image data, third image data having a resolution that is an n-th power of 2 of the resolution of the first image data, if the resolution of the second image data is not an n-th power of 2 of the resolution of the first image data where n is an integer, wherein
if the third image data is generated, the signal processing circuit executes demosaicing on the first image data by referring to the third image data.

4. The image processing apparatus according to claim 3, wherein
the signal processing circuit has a storage circuit that stores the second image data or the third image data, and executes demosaicing on the first image data by referring to the second or third image data stored in the storage circuit.

5. The image processing apparatus according to claim 4, wherein
if a difference between a time when the first image data was captured and a time when the second or third image data stored in the storage circuit was captured is greater than a predetermined value, the signal processing circuit executes demosaicing on the first image data without referring to the second or third image data stored in the storage circuit.

6. The image processing apparatus according to claim 4, wherein
if a total of differences between (i) values of peripheral pixels of the pixel to be interpolated in the first image data and (ii) values of pixels, which are in the second or third image data stored in the storage circuit and are at positions corresponding to the peripheral pixels, is less than or equal to a predetermined value, the signal processing circuit executes demosaicing on the pixel to be interpolated by referring to the second or third image data stored in the storage circuit.

7. The image processing apparatus according to claim 1, wherein
the first image data and the second image data are concurrently captured image data.

8. An image capture apparatus comprising:
a first image sensor;
a second image sensor; and
an image processing apparatus comprising:
a signal processing circuit that obtains first image data and second image data, and executes demosaicing on the first image data by referring to the second image data, wherein a field of view of the second image data overlaps a field of view of the first image data, and resolution of the second image data is higher than that of the first image data, wherein:
each pixel value in the first image data corresponds to one color component out of a plurality of color components that constitute a color filter of an image sensor used for obtaining the first image data,
each pixel value in the second image data corresponds to one color component out of a plurality of color components that constitute a color filter of an image sensor used for obtaining the second image data, and
the signal processing circuit executes demosaicing on the pixel to be interpolated by referring to, out of values of pixels that constitute the second image data, a value of a pixel (i) at a first position corresponding to a position of a pixel to be interpolated in the first image data or pixel (ii) at a second position being closest to the first position, wherein
the first image data is obtained using the first image sensor, and the second image data is obtained using the second image sensor.

9. The image capture apparatus according to claim 8, wherein
a physical pixel pitch of the second image sensor is smaller than that of the first image sensor.

10. The image capture apparatus according to claim 9, wherein
an area dimension of a photoelectric conversion area of a pixel of the first image sensor is greater than an area dimension of a photoelectric conversion area of a pixel of the second image sensor.

11. The image capture apparatus according to claim 9, further comprising:
a first A/D converter that A/D converts a voltage that is based on electric charge accumulated in the first image sensor so as to generate the first image data; and
a second A/D converter that A/D converts a voltage that is based on electric charge accumulated in the second image sensor so as to generate the second image data, wherein
a voltage resolution of the second A/D converter is lower than a voltage resolution of the first A/D converter.

12. The image capture apparatus according to claim 8, wherein
the first image sensor and the second image sensor have the same physical pixel pitch, and a reading pixel pitch of the first image sensor is greater than a reading pixel pitch of the second image sensor.

13. The image capture apparatus according to claim 8, wherein
the first image sensor and the second image sensor have the same physical pixel pitch, the first image data is generated by performing reading with addition from the first image sensor, and the second image data is generated by performing reading without addition from the second image sensor.

14. An image processing method executed by an image processing apparatus, the method comprising:

obtaining first image data and second image data, wherein a field of the second image data overlaps a field of view of the first image data, and resolution of the second image data is higher than that of the first image data; and executing demosaicing on the first image data by referring to the second image data, wherein each pixel value in the first image data corresponds to one color component out of a plurality of color components that constitute a color filter of an image sensor used for obtaining the first image data, each pixel value in the second image data corresponds to one color component out of a plurality of color components that constitute a color filter of an image sensor used for obtaining the second image data, and in the executing, out of values of pixels that constitute the second image data, a value of a pixel (i) at a first position corresponding to a position of a pixel to be interpolated in the first image data or pixel (ii) at a position closest to the first position is referred to.

15. A non-transitory computer-readable storage medium storing a program for causing a computer to function as an image processing apparatus comprising:

a signal processing circuit that obtains first image data and second image data, and executes demosaicing on the first image data by referring to the second image data, wherein a field of view of the second image data overlaps a field of view of the first image data, and resolution of the second image data is higher than that of the first image data, wherein:

each pixel value in the first image data corresponds to one color component out of a plurality of color components that constitute a color filter of an image sensor used for obtaining the first image data, each pixel value in the second image data corresponds to one color component out of a plurality of color components that constitute a color filter of an image sensor used for obtaining the second image data, and the signal processing circuit executes demosaicing on the pixel to be interpolated by referring to, out of values of pixels that constitute the second image data, a value of a pixel (i) at a first position corresponding to a position of a pixel to be interpolated in the first image data or pixel (ii) at a second position being closest to the first position.

* * * * *